United States Patent
Kubota et al.

(10) Patent No.: US 6,631,242 B1
(45) Date of Patent: Oct. 7, 2003

(54) APPARATUS FOR RECORDING AND REPRODUCING DIGITAL PICTURE DATA

(75) Inventors: Yukio Kubota, Kanagawa (JP); Yoichirou Senshu, Kanagawa (JP); Akihiro Uetake, Tokyo (JP); Shinichi Hasegawa, Chiba (JP); Moriyuki Kawaguchi, Tokyo (JP); Hajime Inoue, Tokyo (JP); Takahito Seki, Kanagawa (JP); Keiji Kanota, Kanagawa (JP); Tetsujiro Kondo, Tokyo (JP); Naoki Honda, Miyagi (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 08/424,156

(22) Filed: Apr. 17, 1995

Related U.S. Application Data

(60) Division of application No. 08/270,781, filed on Jul. 5, 1994, now abandoned, which is a continuation of application No. 07/784,720, filed on Oct. 30, 1991, now abandoned, which is a continuation-in-part of application No. 07/768,871, filed on Oct. 29, 1991, now Pat. No. 5,384,666.

(30) Foreign Application Priority Data

Oct. 31, 1990 (JP) .............................. 2-294671
Oct. 31, 1990 (JP) .............................. 2-294673
Oct. 31, 1990 (JP) .............................. 2-294674
Oct. 31, 1990 (JP) .............................. 2-294675
Nov. 13, 1990 (JP) .............................. 2-306703

(51) Int. Cl.[7] ............................................. H04N 5/782
(52) U.S. Cl. ....................... 386/112; 386/115; 386/124; 386/23
(58) Field of Search ................................ 358/330, 335; 360/8, 9.1, 10.3, 15–17, 19.1, 21–22, 32, 33.1, 40–41, 48, 53; 430/39; 428/141; 386/26–28, 109, 124, 112, 22–23, 115

(56) References Cited

U.S. PATENT DOCUMENTS

| | | | |
|---|---|---|---|
| 3,858,514 A | | 1/1975 | Beebe et al. |
| 3,995,313 A | | 11/1976 | Fayling .......................... 360/15 |
| 4,506,000 A | * | 3/1985 | Kubota et al. ................. 430/39 |

(List continued on next page.)

FOREIGN PATENT DOCUMENTS

EP          0 121 384          10/1984

OTHER PUBLICATIONS

"Adaptive Dynamic Range Coding Scheme for Future Consumer Digital VTR", T. Kondo et al., IERE Proc. 7th Int. Conference on Video, Audio and Data Recording, York, UK, Mar. 1988, pp. 219–226.

"An Experimental Digital VCR with 40 mm Drum, Single Actuator and DCT–Based Bit–Rate Reduction", S.M.C. Borgers et al., IEEE Trans. on Cons. Elec., vol. 34, No. 3, Aug. 1988, pp. 597–605.

(List continued on next page.)

*Primary Examiner*—W. R. Young
(74) *Attorney, Agent, or Firm*—Frommer Lawrence & Haug LLP; William S. Frommer; Dennis M. Smid

(57) ABSTRACT

In an apparatus for recording and reproducing a digital picture signal, the large number of data bits in the digital picture signal to be recorded is reduced by a ratio of approximately 1:9, and the thus compressed data are recorded with a recording density of at least approximately 0.8 bit/$\mu$m$^2$ in relatively narrow successive skewed tracks without guard bands on a metal evaporated magnetic tape having predefined characteristics. The magnetic tape has a width of no more than approximately 8 mm and a thickness of no more than approximately 7 $\mu$m and is wound in a relatively small size cassette.

6 Claims, 14 Drawing Sheets

U.S. PATENT DOCUMENTS

| | | | |
|---|---|---|---|
| 4,547,816 A | 10/1985 | Sochor | 360/19.1 |
| 4,549,227 A | 10/1985 | Hashimoto et al. | |
| 4,679,097 A | 7/1987 | Tomita | 358/328 |
| 4,825,305 A | 4/1989 | Itoh et al. | 360/8 |
| 4,997,696 A * | 3/1991 | Kamada et al. | 428/141 |
| 5,384,666 A * | 1/1995 | Kanota et al. | 360/32 |

OTHER PUBLICATIONS

"An Experimental Study on a Home–Use Digital VTR", C. Yamamitsu et al., IEEE, Ch. 2724–3/89/0000–0122, 1989, pp. 122–123.

"An Experimental Study for a Home–Use Digital VTR", C. Yamamitsu et al., IEEE Trans. on Cons. Elec., vol. 35, No. 3, Aug. 1989, pp. 450–457.

"Image Transmission Techniques", Edited By W.K. Pratt, Academic Press, 1979, pp. vii–ix and 113–155.

IEEE Transactions on Consumer Electronics vol. CE–34, No. 3 Aug. 1988, New York US pp. 588–595 XP000111199 Yamamitsu et al., 'An Experimental Study on Bit Rate Reduction and High Density Recording for a Home–Use Digital VTR.

A High Density Recording Technology For Digital VCRS', K. Kanota et al., IEEE Trans. on Cons. Elec, vol. 36, No. 3, Aug. 1990, pp. 540–547.

* cited by examiner

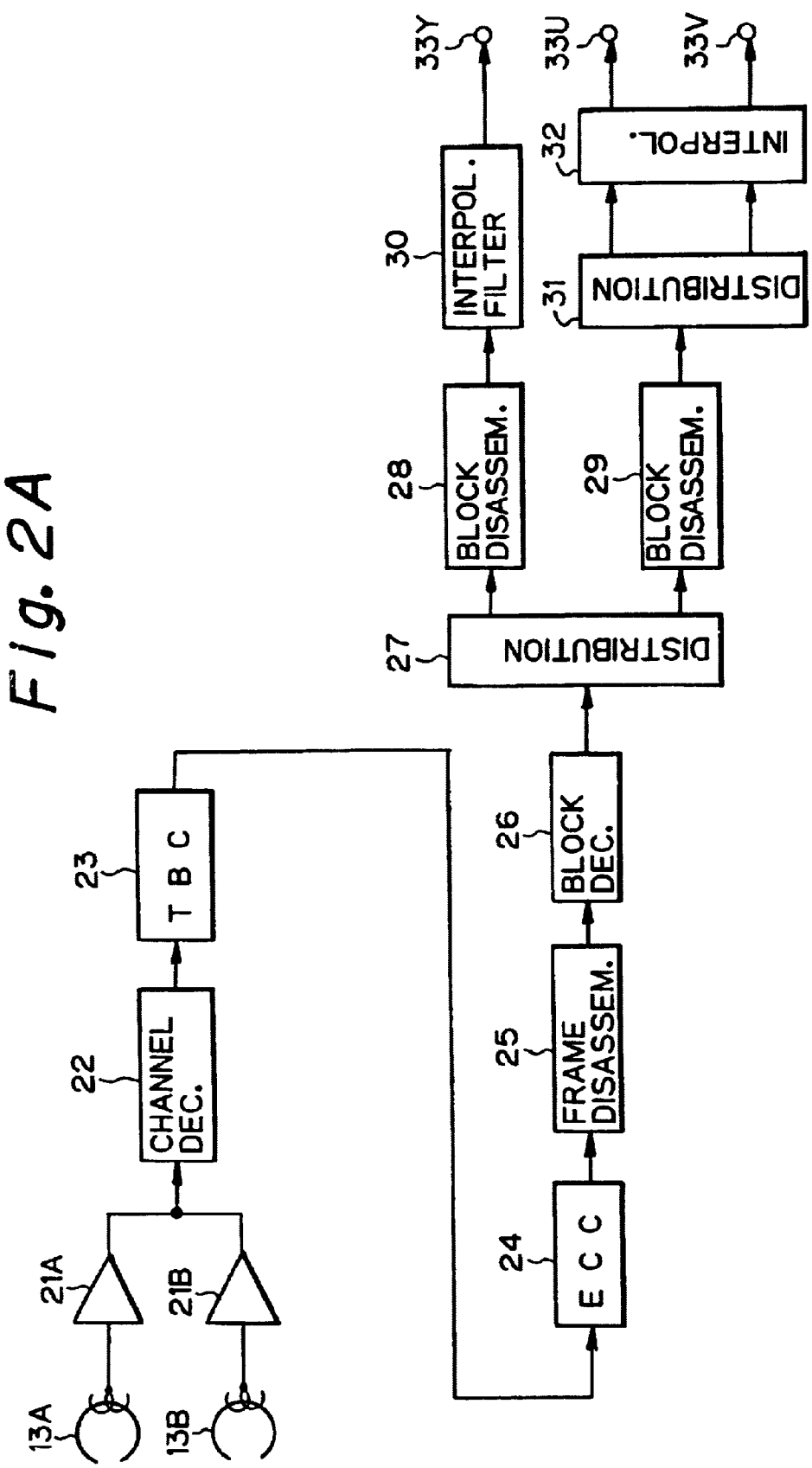

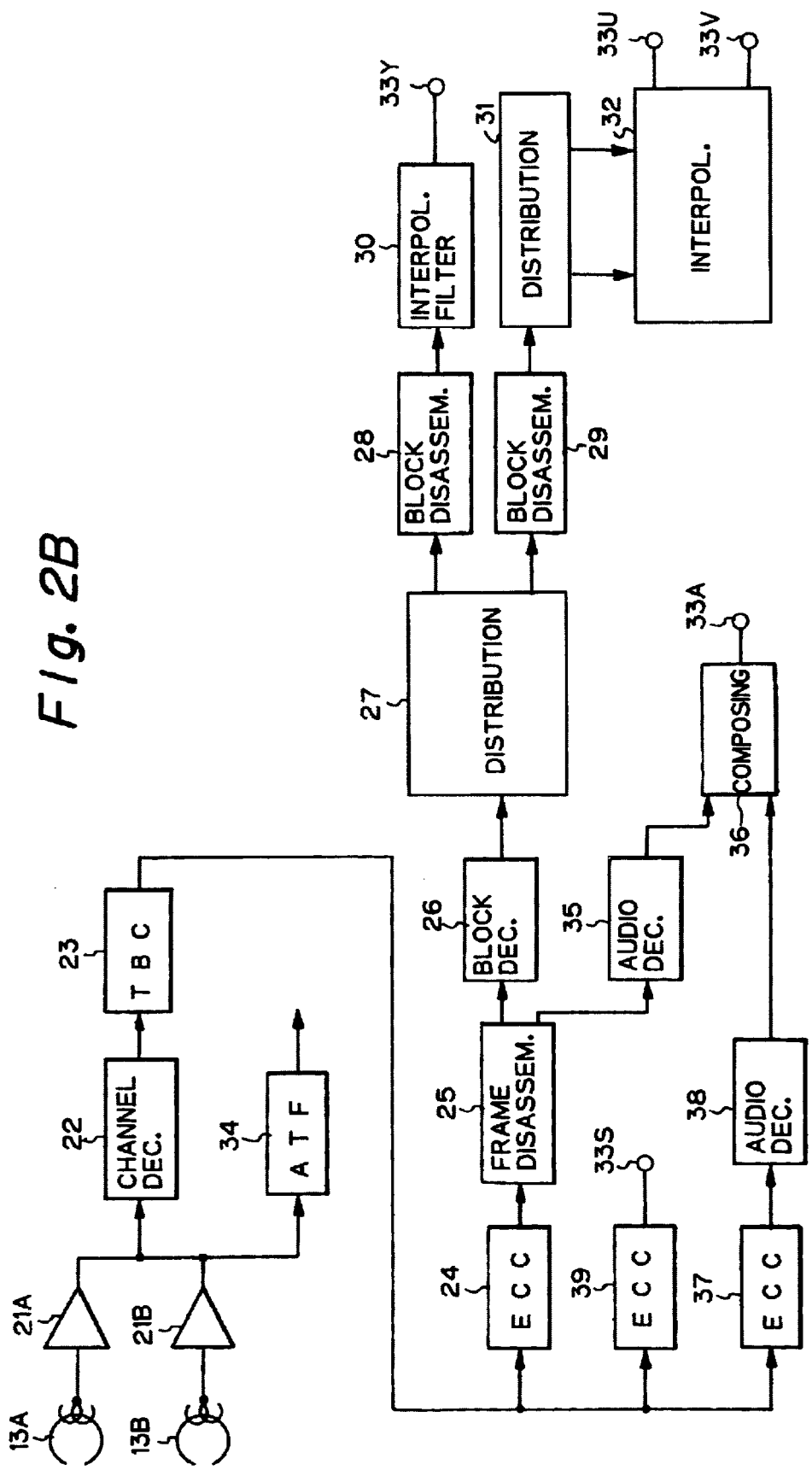

APPARATUS FOR RECORDING AND REPRODUCING DIGITAL PICTURE DATA

RELATED APPLICATIONS

This application is a division of U.S. Patent application Ser. No. 08/270,781 filed Jul. 5, 1994 (now abandoned) which is a continuation of U.S. patent application Ser. No 07/784,720 filed Oct. 3, 1991 (now abandoned) which is a Continuation-In-Part of U.S. patent application Ser. No. 07/768,871, filed Oct. 29, 1991 (which has issued as U.S. Pat. No. 5,384,666 on Jan. 24, 1995

BACKGROUND OF THE INVENTION

1. Field of the Invention

The present invention relates to a recording apparatus and, more particularly, to a recording apparatus for recording a digital picture signal having a relatively large number of data bits onto a magnetic tape that can be contained in a relatively small cassette housing.

2. Description of the Prior Art

A D1 format component type digital VTR and a D2 format composite type digital VTR have been developed for use by broadcasting stations in digitizing color video signals and recording the digitized signals on a recording medium, such as a magnetic tape.

In the D1 format digital VTR, a luminance signal and first and second color difference signals are A/D converted with sampling frequencies of 13.5 MHz and 6.75 MHz, respectively. Thereafter, the signals are suitably processed and then recorded on a tape. Since the ratio of sampling frequencies of the signal components is 4:2:2, this system is usually referred to as the 4:2:2 system.

On the other hand, in the D2 format video digital VTR, a composite video signal is sampled with a signal having a frequency 4 times higher than the frequency fsc of a color subcarrier signal and then A/D converted. Thereafter, the resultant signal is suitably processed and then recorded on a magnetic tape.

Since these known D1 and D2 format digital VTRs are designed for professional use, for example, in broadcasting stations, the attainment of high picture quality is given top priority in the design and construction of such VTRs, and the weight and size of the apparatus are not overly important.

In these known digital VTRs, the digital color video signal, which results from each sample being A/D converted into, for example, 8 bits, is recorded without being substantially compressed. As an example, when the known D1 format digital VTR A/D converts each sample into 8 bits with the frequencies noted above, the data rate representing the color video signal is approximately 216 Mbps (megabits per second). When the data in the horizontal and vertical blanking intervals are removed, the number of effective picture elements of the luminance signal per horizontal interval and the number of effective picture elements of each color difference signal per horizontal interval become 720 and 360, respectively. Since the number of effective scanning lines for each field in the NTSC system (525/60) is 250, the data bit rate Dv can be expressed as follows:

$$Dv=(720+360+360)\times 8\times 250\times 60=172.8 \text{ Mbps}$$

Even in the PAL system (625/50), since the number of effective scanning lines for each field is 300 and the number of fields per second is 50, it is obvious that the data bit rate in the PAL system is the same as that in the NTSC system.

If the redundant components necessary for error correction and the format with respect to such data are considered the total bit rate of picture data becomes approximately 205.8 Mbps.

Further, the amount of audio data Da is approximately 12.8 Mbps, while the amount of additional data Do, such as, data of a gap, a preamble, and a postamble used in editing, is approximately 6.6 Mbps. Thus, the bit rate of information data to be recorded can be expressed by the following equation:

$$Dt=Dv+Da+Do$$

$$Dt=172.8+12.8+6.6=192.2 \text{ Mbps}.$$

In order to record such amount of information data, the known D1 format digital VTR employs a segment system having a track pattern comprised of 10 tracks for each field in the NTSC system, or comprised of 12 tracks for each field in the PAL system.

A recording tape with a width of 19 mm is used. There are two types of recording tapes having thicknesses of 13 $\mu$m and 16 $\mu$m, respectively. To house these tapes, there are three types of cassettes, which are respectively characterized as being of the large type, middle type, and small type. The information data is recorded on such tapes in the above mentioned format with the tape area for each bit of data being approximately 20.4 $\mu m^2$/bit, which corresponds to a recording density of 1/20.4 bit/$\mu m^2$. When the recording density is increased, an error tends to take place in the playback output data due to interference between codes or non-linearity of the electromagnetic conversion system of the head and tape. Heretofore, even if error correction encoding has been performed, the above given value of the recording density has been the limit therefor.

By putting all the above described parameters together, the playback times for the cassettes of various sizes and the two tape thicknesses, when employed in the digital VTR in the D1 format can be tabulated as follows:

| Size/tape thickness | 13 $\mu$m | 16 $\mu$m |
| --- | --- | --- |
| Small | 13 minutes | 11 minutes |
| Middle | 42 minutes | 34 minutes |
| Large | 94 minutes | 76 minutes |

Although the described D1 format digital VTR can provide satisfactorily,high picture quality for use in broadcasting stations, even if a large cassette housing a tape with a thickness of 13 $\mu$m is used, the playback time is at most 1.5 hours. Thus, such a VTR is not adequate for consumer or home use in which a playback time at least sufficient for the recording of a telecast movie is required. On the other hand, in VTRs intended for consumer or home use, the β system, the VHS system, the 8-mm system, and so forth have been employed. However, in each of these systems for consumer or home use, analog signals have been recorded and reproduced. Although the picture quality of these analog VTRs has been improved to the point where the quality is satisfactory when a video signal is simply recorded and then reproduced for viewing, the picture quality is significantly degraded when the recorded signal is dubbed and copied. Thus, when the recorded signal is dubbed several times, the picture quality will become unacceptable to the viewers.

As is to be appreciated, if the data to be recorded and reproduced are in digital form as, for example, in the case of the above-described D1 and D2 digital VTR's, signals having acceptable picture quality can be produced even if the signal data are dubbed several times. Thus, while the D1 and D2 digital VTR's can produce signals of acceptable picture quality even if the signals are dubbed several times, such digital VTR's are relatively large in size, relatively expensive and, as previously mentioned, are limited to a relatively short record or playback time. As a result, the D1 and D2 digital VTR's are typically unacceptable for home use.

Thus, the prior art has failed to provide a relatively low-cost VTR for home use which records and reproduces a digital picture signal so as to produce signals having acceptable picture quality when subjected to the above described situations, is of a relatively small size and is capable of recording a reasonably large amount of data.

OBJECTS AND SUMMARY OF THE PRESENT INVENTION

Accordingly, it is an object of the present invention to provide an apparatus for recording and reproducing a digital picture signal which avoids the above-mentioned disadvantages of the prior art.

More specifically, it is an object of the present invention to provide an apparatus for recording and reproducing a digital picture signal which is capable of recording a relatively large amount of digital picture signal data and is relatively small in size.

It is another object of the present invention to provide an apparatus for recording and reproducing a digital picture signal as aforesaid having a magnetic tape wound in a tape cassette, in which the magnetic tape has a width of no more than approximately 8 mm and a thickness of no more than approximately 7 $\mu$m.

It is yet another object of the present invention to provide an apparatus for recording and reproducing a digital picture signal as aforesaid which reduces the number of data bits of the received digital picture signal and records the reduced number of data bits in successive skewed tracks, and in which each track has a width of approximately 5.0 $\mu$m, with a recording density of at least approximately 0.8 bits/$\mu$m$^2$.

It is still another object of the present invention to provide an apparatus for recording and reproducing a digital picture signal as aforesaid in which each recording head is positioned so as to have an azimuth angle of approximately 20°.

It is still a further object of the present invention to provide an apparatus for recording and reproducing a digital picture signal as aforesaid in which the magnetic tape is wound on the peripheral surface of a rotation drum so as to have a winding angle of less than 180°.

According to an aspect of the present invention, an apparatus for recording an input digital picture signal comprises a magnetic tape wound in a cassette and having a width of no more than approximately 8 mm and a thickness of no more than approximately 7 $\mu$m; a data processing device for reducing the data of the input digital picture signal by a ratio of approximately 1:9 so as to provide a recordable signal having a reduced data bit rate; and a device for recording the reduced data bit rate signal in successive skewed tracks on the tape with an areal recording density of at least approximately 0.8 bits/$\mu$m$^2$ The above, and other objects, features and advantages of the present invention, will be more fully understood from the following detailed description of preferred embodiments of the present invention when read in conjunction with the accompanying drawings in which corresponding parts are identified by the same reference numerals.

BRIEF DESCRIPTION OF THE DRAWINGS

FIGS. 2A and 2B are block diagrams of playback circuits in an apparatus having the recording circuits of FIGS. 1A and 1B, respectively;

DETAILED DESCRIPTION OF THE PREFERRED EMBODIMENTS

Figure 1A:
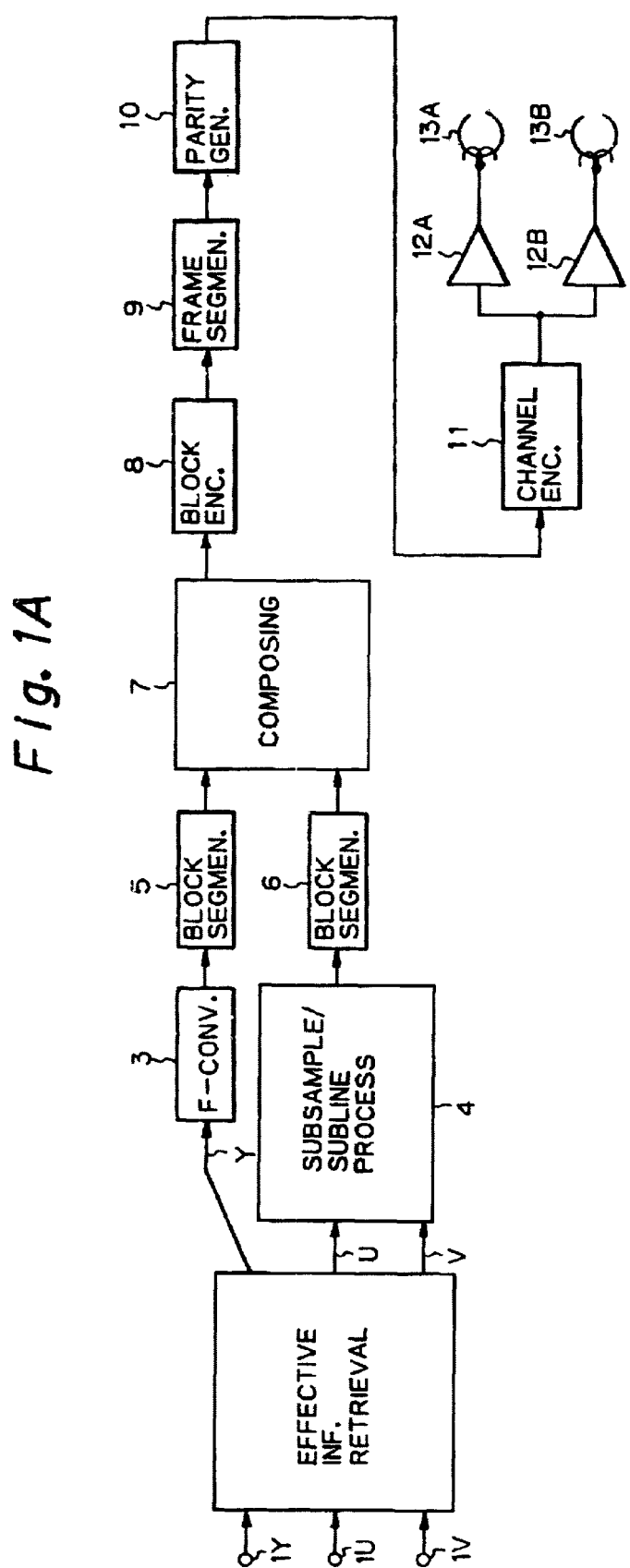
FIGS. 1A and 1B are block diagrams of recording circuits in an apparatus according to respective embodiments of the present invention.

The size of a VTR is largely dependant on the size of the tape cassette to be used therein. Therefore, by using a relatively small size tape cassette, the size of a VTR can be reduced accordingly. However, as is to be appreciated, a small size cassette holds a proportionately small volume of magnetic tape. Typically, with a conventional digital VTR and a small tape cassette, only a relatively small amount of digital picture data can be recorded on the consequent small volume of tape. To enable a relatively large amount of data to be recorded on this small volume of tape, significant changes are required in the VTR and tape cassette. The present VTR and tape cassette incorporate such changes while ensuring that the recording and playback quality will not be adversely affected.

More specifically, as hereinafter more fully described, the tape thickness is decreased to a relatively small value, thereby increasing the recording area of the tape that can be contained in a cassette of predetermined volume. Further, tracks having relatively small widths and without guard bands are formed on a metal evaporated (ME) tape having predefined characteristics. As a result, the number of data bits which may be recorded per unit area on the tape, that is, the recording density, is increased. Furthermore, the amount of digital picture data is significantly reduced by hereinafter described data compression and processing techniques prior to being recorded.

As may be expected, these changes have the potential to adversely affect the operation or performance of the VTR. For example, reducing the tape thickness may make the tape excessively difficult to handle and may even result in the tape being damaged during normal loading and unloading or recording and reproducing operations. Likewise, reducing the width of the tracks may increase the amount of cross talk between signals on adjacent tracks, may increase the linearity error of the tracks and may decrease the carrier-to-noise (C/N) ratio. However, these adverse effects may be compensated by incorporating still other changes into the VTR and tape cassette. For example, using a Viterbi decoder and the previously-mentioned ME tape increases the C/N ratio. Further, changing the azimuth angle and the winding angle, from those typically utilized, reduces cross-talk and linearity error. However, changing the azimuth angle may also affect the performance of the VTR.

Therefore, while the above-mentioned factors or parameters can be incorporated so as to increase the amount of data which may be recorded onto a relatively small volume of magnetic tape, they may not be indiscriminately selected. Instead all of the consequences associated with the selection of each parameter must be carefully analyzed and evaluated so as to achieve the desired overall results.

The parameters incorporated in the present VTR and tape cassette have been devised so as to enable a relatively large amount of data, for example, the amount of data corresponding to approximately four hours of recording, to be recorded on a relatively small volume of magnetic tape and still provide a relatively high quality reproduced picture signal.

A signal process portion of a digital VTR according to an embodiment of the present invention, will now be described with reference to FIG. 1A. As shown therein, a digital luminance signal Y and digital color difference signals U and V, which are formed by three primary color signals R, G and B, are respectively supplied to input terminals 1Y, 1U and 1V. The three primary color signals R, G, and B may, for example, be supplied from a color video camera. The respective clock rates of these signals are substantially the same as the frequencies of the component signals of the above-mentioned D1 format digital VTR. In other words, the sampling frequencies for the luminance and color difference signals are 13.5 MHz and 6.75 MHz, respectively. Similarly, the number of bits per sample is also 8 bits. Thus, the amount of data per second which is supplied to the input terminals 1Y, 1U and 1V is also approximately 216 Mbps as earlier described.

The signals from the input terminals 1Y, 1U and 1V are supplied to an effective information retrieval circuit 2 which is adapted to omit or remove data from the received signals during the blanking intervals and to retrieve information only from the effective area. As a result, the data are compressed, such that, the data rate is reduced to approximately 167 Mbps.

The luminance signal Y from the effective information retrieval circuit 2 is supplied to a frequency conversion circuit 3. The frequency conversion circuit 3 converts the sampling frequency from 13.5 MHz into a frequency which is ¾ of 13.5 MHz. The frequency conversion circuit 3 may include a thin-out filter so as to prevent reflected distortion from occurring. The output signal of the frequency conversion circuit 3 is supplied to a block segmentation circuit 5. The block segmentation circuit 5 converts the received series luminance data into a block sequence.

Figure 3:
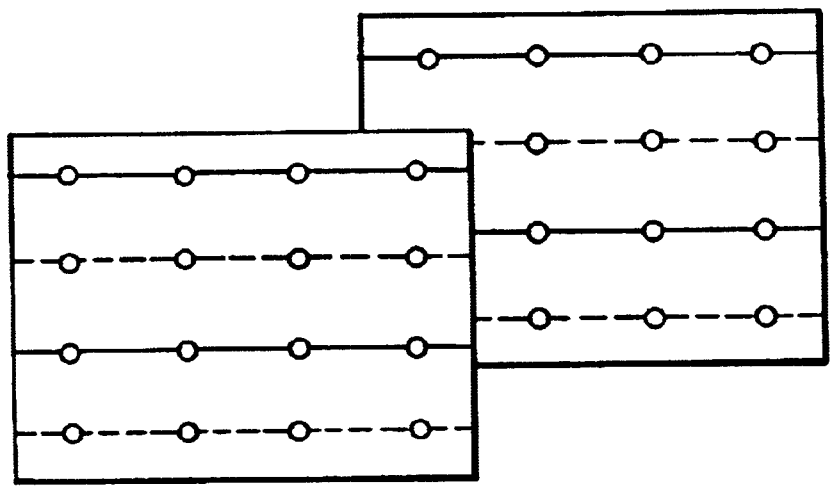
FIG. 3 is a schematic diagram to which reference will be made in describing block encoding.

FIG. 3 is a schematic diagram illustrating a three-dimensional arrangement of blocks which may be used by the block segmentation circuit 5 as an encoding unit. More specifically, by dividing a screen which may occupy, for example, two frames as shown in FIG. 3, a large number of unit blocks (4 lines×4 picture elements×2 frames) are formed. In FIG. 3, the solid lines represent lines associated with odd fields, while the broken lines represent lines associated with even fields.

Figure 4:
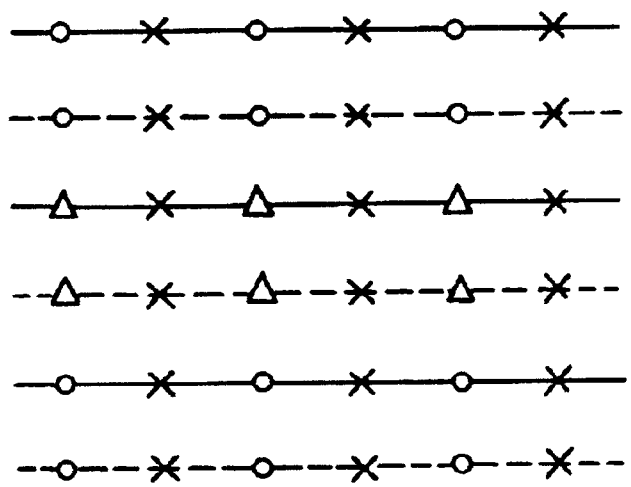
FIG. 4 is a schematic diagram to which reference will be made in describing subsampling and subline processing.

Returning to FIG. 1A, it will be seen that the two color difference signals U and V from the effective information retrieval circuit 2 are supplied to a subsampling and subline processing circuit 4. The subsampling and subline processing circuit 4 converts the sampling frequency from 6.75 MHz into a frequency which is ½ of 6.75 MHz and then alternately selects one of the two digital color difference signals for each line. Thereafter, the subsampling and subline processing circuit 4 composes the two digital color difference signals into one channel of data and outputs a line sequential digital color difference signal. FIG. 4 shows picture elements of a signal which have been sub-sampled and sub-lined by the circuit 4. In FIG. 4, "0" represents a sampling picture element of the first color difference signal U; "Δ" represents a sampling picture element of the second color difference signal V; and "X" represents a position in which a picture element has been thinned out by the sampling processing.

The line sequential signal from the subsampling and subline processing circuit 4 is supplied to a block segmentation circuit 6. In a manner similar to the block segmentation circuit 5, the block segmentation circuit 6 converts scanning sequence color difference data of television signals into a block sequence data arrangement having a relatively large number of unit blocks, in which each block may be (4 lines×4 picture elements×2 frames) in size. The output signals of the block segmentation circuits 5 and 6 are supplied to a composing circuit 7.

The composing circuit 7 converts the received luminance signal and the color difference signal which have been converted into respective block sequence signals into one channel of data. The output signal of the composing circuit 7 is supplied to a block encoding circuit 8. As will be more fully described hereinafter, an encoding circuit adaptable to the dynamic range (ADRC) of each block, a Discrete Cosine Transform (DCT) circuit, or the like can be utilized in the block encoding circuit 8. The output signal of the block encoding circuit 8 is supplied to a frame segmentation circuit 9. The frame segmentation circuit 9 converts the received signal into data having a frame construction. The frame segmentation circuit 9 exchanges between a picture system clock and a record system clock.

The output signal of the frame segmentation circuit 9 is supplied to a parity generation circuit 10 which generates an error correction code parity signal. The output signal of the parity generation circuit 10 is supplied to a channel encoder 11 which performs channel encoding so as to decrease the low band of the record data. The output signal of the channel encoder 11 is supplied through recording amplifiers 12A and 12B and rotation transformers (not shown) to magnetic heads 13A and 13B, respectively, and is then recorded on magnetic tape.

Figure 1B:
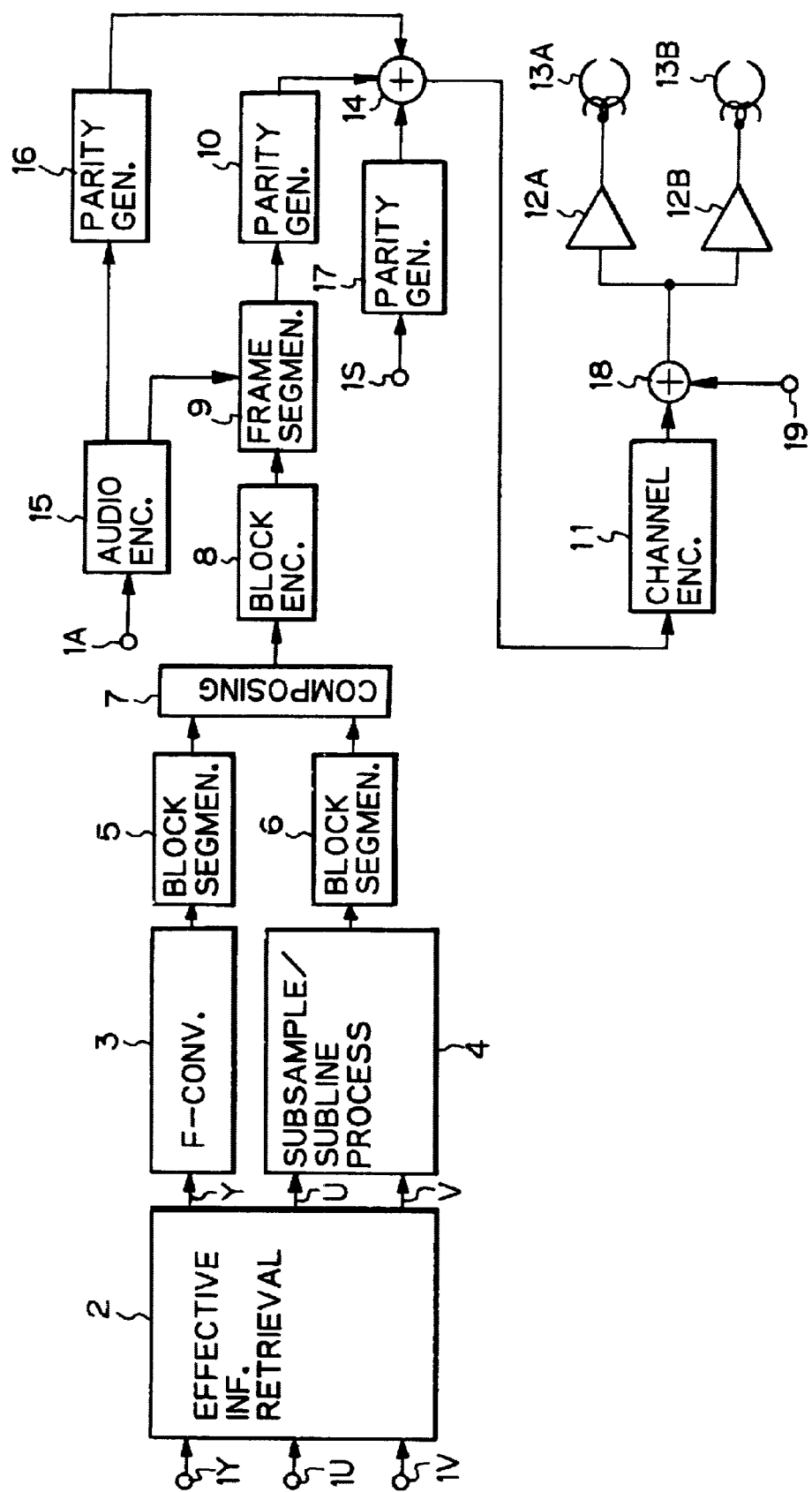

Referring now to FIG. 1B, it will be seen that recording side of the digital VTR there illustrated is similar to that of FIG. 1A and, as such, only the differences therebetween will be described below.

In FIG. 1B, a digital audio signal is supplied from an input terminal 1A to an audio encoding circuit 15. The audio encoding circuit 15 is adapted to compress the received audio signal by differential pulse code modulation (DPCM) processing. The output data of the audio encoding circuit 15 is supplied to the frame segmentation circuit 9 which converts this output data, along with the block encoded picture data from the block encoding circuit 8, into data having a frame construction. The output audio data supplied to the frame segmentation circuit 9 is real time data and relates to the picture data.

The output signal of the frame segmentation circuit 9 in FIG. 1B is also supplied to a parity generation circuit 10 which generates an error correction code parity signal. The output signal of the parity generation circuit 10 in FIG. 1B is supplied to a mixing circuit 14. The output data of the audio encoding circuit 15 is further supplied to a parity generation circuit 16 which generates an error correction code parity signal. The parity signal from parity generation circuit 16 is supplied to the mixing circuit 14. Subdata from an input terminal 1S is supplied to a parity generation circuit 17 which performs an error correction encoding process on the received subdata and generates a parity signal. The parity signal from the parity generation circuit 17 is also supplied to the mixing circuit 14.

The mixing circuit 14 is adapted to combine the received parity signals from the parity generation circuits 10, 16 and 17 such that picture data, audio data and subdata are arranged in a predetermined pattern. The output signal of the mixing circuit 14 is supplied to a channel encoder 11 which performs channel encoding so as to decrease the low band of the record data. The output signal of the channel encoder 11 is supplied to a mixing circuit 18 along with a pilot signal for automatic track following (ATF) control from an input terminal 19. The pilot signal is a relatively low frequency signal which can be readily separated from the record data. The output signal of the mixing circuit 18 is supplied through recording amplifiers 12A and 12B and rotation transformers (not shown) to magnetic heads 13A and 13B, respectively, and is then recorded on magnetic tape.

In the above-described signal process portion of the recording sides of digital VTR shown on FIGS. 1A and 1B, by not considering the blanking intervals and by retrieving data only from the effective area, the input data rate of 216 Mbps is decreased to approximately 167 Mbps. The frequency conversion and the sub-sample and sub-line processing further reduce the data rate to approximately 84 Mbps. As a result of the compressing and encoding by the block encoding circuit 8, the data rate is still further reduced to approximately 25 Mbps. Thereafter, by adding additional information such as a parity signal and an audio signal to the resultant compressed data, the recording data rate becomes approximately 31.5 Mbps.

The playback sides of digital VTRs according to the invention will now be described with reference to FIGS. 2A and 2B. As is to be appreciated, the playback sides of FIGS. 2A and 2B correspond to the recording sides of FIGS. 1A and 1B, respectively.

In FIG. 2A, playback data obtained from the magnetic heads 13A and 13B are supplied through rotation transformers (not shown) and playback amplifiers 21A and 21B, respectively, to a channel decoder 22. The channel decoder 22 is adapted to demodulate the received channel encoded data. The output signal of the channel decoder 22 is supplied to a time base compensation (TBC) circuit 23 which removes time base fluctuating components from the reproduced signal. The reproduced playback data from the TBC circuit 23 is supplied to an error correction code (ECC) circuit 24 which corrects and modifies errors by utilizing a predetermined error correction code. The output signal of the ECC circuit 24 is supplied to a frame disassembling circuit 25.

The frame disassembling circuit 25 separates each component of the block encoded picture data and exchanges between the recording system clock and the picture system clock. Each data component separated in the frame disassembling circuit 25 is supplied to a block decoding circuit 26. The block decoding circuit 26 decodes the received data in accordance with the original data of each block and supplies the decoded data to a distribution circuit 27. The distribution circuit 27 separates a luminance signal and color difference signal from the received decoded data which are supplied to block disassembling circuit 28 and 29, respectively. The block disassembling circuits 28 and 29 function in a substantially opposite manner to that of block segmentation circuits 5 and 6 of FIG. 1A. More specifically, the block disassembling circuits 28 and 29 convert the received block sequence signals into raster scanning sequence signals.

The decoded luminance signal from the block disassembling circuit 28 is supplied to an interpolation filter 30 which converts the sampling rate of the luminance signal from 3 fs to 4 fs (4 fs=13.5 MHz). The digital luminance signal Y from the interpolation filter 30 is supplied to an output terminal 33Y.

On the other hand, the digital color difference signal from the block disassembling circuit 29 is supplied to a distribution circuit 31. The distribution circuit 31 separates digital color difference signals U and V from the line sequential digital color difference signals U and V. The separated digital color difference signals U and V are supplied from the distribution circuit 31 to an interpolation circuit 32. The interpolation circuit 32 interpolates the received decoded picture element data to obtain the line and picture element data which have been previously thinned out by the circuit 4 of FIG. 1A. The interpolation circuit 32 supplies digital color difference signals U and V, each having a sampling rate of 4 fs, to output terminals 33U and 33V, respectively.

The playback side of the digital VTR of FIG. 2B is similar to that of FIG. 2A and, as such, only the differences therebetween will be described below.

In FIG. 2B, playback data obtained from the magnetic heads 13A and 13B are supplied through rotation transformers (not shown) and playback amplifiers 21A and 21B, respectively, to the. channel decoder 22 and an ATF circuit 34. As previously described, the channel decoder 22 is adapted to demodulate the received channel encoded data. The output signal of the channel decoder 22 is supplied to the TBC circuit 23 which removes time base fluctuating components from the playback signal. The ATF circuit 34 generates a tracking, error signal in accordance with the level of a beat component of the reproduced pilot signal. The tracking error signal from ATF circuit 34 may be supplied to a phase servo circuit of a capstan servo circuit (not shown). The ATF circuit 34 functions in substantially the same manner as that of a conventional VTR.

The playback data from the TBC circuit 23 is supplied to ECC circuits 24, 37 and 39 which correct and modify errors by using a predetermined error correction code. More particularly, the ECC circuit 24 corrects and modifies errors in the picture data, the ECC circuit 37 corrects and modifies errors in the audio data recorded in an audio dedicated area, and the ECC circuit 39 corrects errors in the subdata. The output signal of the ECC circuit 37 is supplied to an audio decoding circuit 38 which decodes the compressed and encoded audio signal. The decoded data from the audio decoding circuit 38 are supplied to a composing circuit 36. The subdata from the ECC circuit 39 is supplied through an output terminal 33S of the ECC circuit 39 to a system controller (not shown) which controls the operations of the VTR. The output signal of the ECC circuit 24 is supplied to a frame disassembling circuit 25.

The frame disassembling circuit 25 separates each component of the block encoded picture data and exchanges between the recording system clock and the picture system clock. Each data component separated in the frame disassembling circuit 25 is supplied to a block decoding circuit 26, as previously described. The frame disassembling circuit 25 further separates audio data from the received signal and supplies the separated audio data to an audio decoding circuit 35. The audio decoding circuit 35 decodes the separated audio data so as to retrieve the original audio data which are supplied to the composing circuit 36. The composing circuit 36 switches between the two audio signals received from the decoding circuits 35 and 38 or combines them in a close fading arrangement and supplies the output audio signal to an output terminal 33A.

The block encoding circuit 8 of FIG. 1A or 1B may include an ADRC (Adaptive Dynamic Range Coding) encoder similar to that disclosed in Japanese Patent Application Nos. SHO 59-266407 and SHO 59-2698666, which have a common assignee herewith. Such ADRC encoder generally detects the maximum value MAX and the minimum value MIN of data representing a plurality of picture elements contained in each block and then calculates a dynamic range DR of the block from the detected maximum and minimum values. Thereafter, the ADRC encoder encodes the data in accordance with the dynamic range such that the data are requantized so as to have a lesser number of bits than those of the original picture element data.

Alternatively, the block encoding circuit 8 may include a discrete cosine transform circuit in which the picture element data of each block is subjected to discrete cosine transform (DCT) processing and the coefficient data obtained by the DCT processing are quantized. Thereafter, the quantized data are compressed by utilizing the run-length Huffman encoding process.

Figure 5:
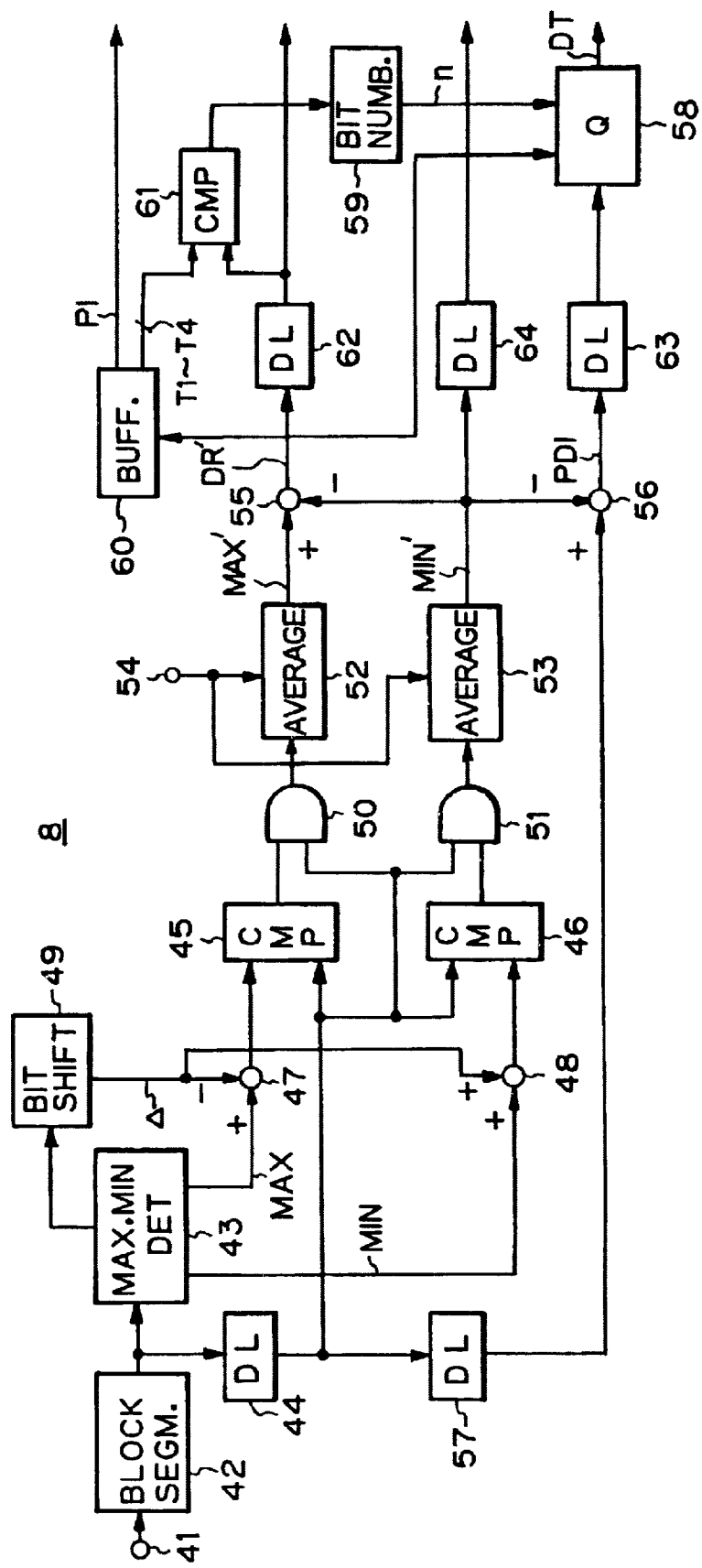
FIG. 5 is a block diagram of a block encoding circuit.

An example of a block encoding circuit having an ADRC encoder, in which the picture quality is not degraded by multiple dubbing operations, will now be described with reference to FIG. 5 in which an input terminal 41 receives the output signal from the composing circuit 7 of FIG. 1A or 1B where each sample of the signal has been quantized to 8 bits.

The block segmentation data from the input terminal 41 are supplied to a maximum value and minimum value detection circuit 43 and a delay circuit 44. The maximum value and minimum value detection circuit 43 detects the minimum value MIN and the maximum value MAX for each block of received data. The delay circuit 44 delays the received data for the time period necessary for the circuit 43 to detect the maximum and minimum values. The picture element data from the delay circuit 44 are supplied to comparison circuits 45 and 46.

The maximum value MAX and the minimum value MIN from the detection circuit 43 are supplied to a subtraction circuit 47 and an addition circuit 48, respectively. The value of a quantized step width for the situation in which non-edge matching quantization is performed with a fixed length of 4 bits, that is $\Delta = \frac{1}{16}$ DR, is applied from a bit shift circuit 49 to the subtraction circuit 47 and the addition circuit 48. More specifically, in the bit shift circuit 49, the dynamic range DR is shifted by 4 bits so as to deviate or shift the dynamic range by ($\frac{1}{16}$). The value $\Delta$ may be a fixed value which is equivalent to a noise level value and the quantizing step width value. The subtraction circuit 47 subtracts the quantized step width value $\Delta$ from the maximum value MAX and outputs a threshold value of (MAX-$\Delta$). On the other hand, the addition circuit 48 adds the quantized step width A value and the minimum value MIN together and outputs a threshold value of (MIN+$\Delta$). The threshold values from the subtraction circuit 47 and the addition circuit 48 are supplied to the comparison circuits 45 and 46, respectively.

The output signal of the comparison circuit 45 is supplied to one input terminal of an AND gate 50. The output signal of the comparison circuit 46 is supplied to one input terminal of an AND gate 51. The delayed data from the delay circuit 44 are supplied to the other input terminals of AND gates 50 and 51.

The output signal of the comparison circuit 45 is a relatively high value when the level of the data from the delay circuit 44 is greater than that of the threshold value. When this occurs, picture element date from the delay circuit 44 having level values in the maximum level range of (MAX to MAX-$\Delta$) are supplied from the output terminal of AND gate 50. On the other hand, the output signal of the comparison circuit 46 is a relatively high value when the level of the data from the delay circuit 44 is less than that of the threshold value. When this occurs, picture element data from the delay circuit 44 having level values in the minimum level range of (MIN to MIN+$\Delta$) are supplied from the output terminal of AND gate 51.

The output signals of AND gates 50 and 51 are respectively supplied to averaging circuits 52 and 53 which calculate average values for each block. A reset signal is supplied from a terminal 54 to the averaging circuits 52 and 53 at a rate corresponding to the block intervals. The averaging circuit 52 outputs an average value MAX' of the picture element data in the maximum level range of (MAX to MAX-$\Delta$). Similarly, the averaging circuit 53 outputs an average value MIN' of the picture element data in the minimum level range of (MIN to MIN+$\Delta$). The average values MAX' and MIN' are supplied to a subtraction circuit 55 which subtracts the average value MIN' from the average value MAX' and outputs an adjusted dynamic range DR'.

The average value MIN' is further supplied to a subtraction circuit 56. The delayed data from the delay circuit 44 is supplied through a delay circuit 57 to the subtraction circuit 56. The subtraction circuit 56 subtracts the average value MIN' from the delayed data from the delay circuit 57 and outputs data PD1 in which the minimum value has been removed. The data PD1 is supplied through a delay circuit 63 to a quantizing circuit 58, which may include a ROM. The adjusted dynamic range DR' from the subtraction circuit 55 and a bit number n from a bit number determination circuit 59 are also supplied to the quantizing circuit 58. More specifically, in the embodiment being described, ADRC with variable length encoding is used, with the number of bits assigned for quantization being one of 0 bits (no code signal transmission), 1 bit, 2 bits, 3 bits or 4 bits, and with an edge matching quantizing operation being performed. The bit number determination circuit 59 determines the number of bits (n) to be assigned for each block and applies corresponding data to the quantizing circuit 58.

In ADRC with Variable length encoding, for a block having a relatively small dynamic range DR', the bit number n is decreased, while for a block having a relatively large dynamic range DR', the bit number n is increased. Thus, the encoding operation can be effectively performed.

To further clarify this matter, consider the situation in which a threshold value for determining the bit number n is T1 to T4 (where T1<T2 21 T3<T4 ). For a block in which (DR'<T1), the dynamic range DR' information is transmitted, but not the code signal. For a block in which (T1<=DR'<T2 ), (n=1) is assigned. For a block in which (T2 <=DR'<T3), (n=2) is assigned. For a block in which (T3 <=DR'<T4), (n=3) is assigned. For a block in which (DR'>= T4), (n=4) is assigned.

In ADRC with variable length encoding, by varying the threshold values T1 to T4, the amount of information generated or supplied can be controlled, that is, the information can be buffered. Thus, even for a transmission path as in the present digital VTR in which the amount of supplied information is set to a predetermined value, ADRC with variable length encoding can be utilized.

Referring again to FIG. 5, a buffering circuit 60 receives the dynamic range DR' from the subtraction circuit 55 and is adapted for determining the threshold values T1 to T4 so as to set the amount of information which may be generated or supplied to a predetermined value. The buffering circuit 60 has a plurality of sets, for example, 32 sets, of threshold values (T1, T2, T3, T4). The sets of the threshold values are identified by a parameter code Pi (where i=0, 1, 2, ..., 31). In a preferred embodiment, as the value of i increases, the amount of information which may be generated linearly decreases. However, as the amount of generated information decreases, the quality of the picture being recorded is degraded.

The threshold values T1 to T4 from the buffering circuit 60 are supplied to a comparison circuit 61. The dynamic range DR'from the subtraction circuit 55 is also supplied to the comparison circuit 61 through a delay circuit 62. The delay circuit 62 delays the dynamic range DR' for the time period necessary for the buffering circuit 60 to select a set of threshold values. The comparison circuit 61 compares the dynamic range DR' of the block with each threshold value and supplies a compared output to the bit number determination circuit 59. As previously described, the determination circuit 59 determines the number of bits (n) to be assigned to the block and supplies data representing such number to the quantizing circuit 58. The quantizing circuit 58 converts the data PD1 received from the delay circuit 63, in which the minimum value has been removed as previously described, into a code signal DT by the edge matching quantizing operation utilizing the received dynamic range DR' and the assigned bit number n. This code signal DT is outputted from the quantizing circuit 58.

The dynamic range DR' and the average value MIN' from the delay circuits 62 and 64, respectively, are outputted. Furthermore, the parameter code Pi which represents the code signal DT and the set of threshold values is outputted.

In the above-described arrangement, since a signal which had been quantized in a non-edge matching operation is requantized in an edge matching operation in accordance with information concerning the dynamic range, the degradation of pictures being dubbed is relatively minimal.

Practical arrangements of the channel encoder 11 (FIG. 1A or 1B) and the channel decoder 22 (FIG. 2A or 2B) may be as disclosed in Japanese Patent Application No. HEI 1-143,491, having a common assignee herewith, and as now further described with reference to FIGS. 6 and 7, respectively.

Figure 6:
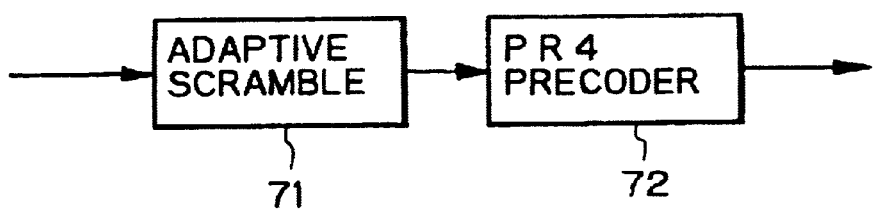
FIG. 6 is a block diagram of a channel encoder.
Figure 7:
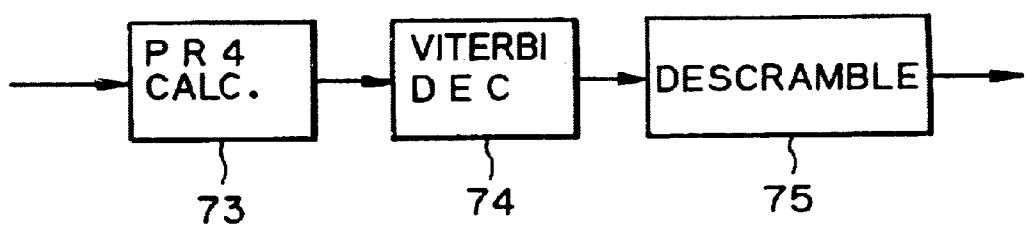
FIG. 7 is a block diagram of a channel decoder.

More particularly, in the channel encoder 11 of FIG. 6, the output of the parity generation circuit 10 is supplied to an adaptive type scramble circuit 71. In fact, a plurality of M system scramble circuits are provided, with one of such circuits being selected so that the high frequency component and the DC component are smallest therein with respect to the input signal. The output of the scramble circuit 71 is supplied to a partial response class 4 detection type precoder 72.

The precoder 72 calculates $1/1-D^2$ (where D is a unit delay or delay operator). The precoder output is supplied to the magnetic heads 13A and 13B through the record amplifiers 12A and 12B, respectively, for recording on the tape. The reproduced signals output from the heads 13A and 13B are amplified by the playback amplifiers 21A and 21B prior to being supplied to a partial response class 4 calculation process circuit 73 in the channel decoder 22 (FIG. 7). The circuit 73 performs the calculation 1+D on the reproduced output signals and, the result of such calculation, is supplied to a Viterbi decoding circuit 74 which decodes the output of the calculation process circuit 73 in accordance with the Viterbi algorithm.

As disclosed in "Analog Viterbi Decoding for High Speed Digital Satellite Channels", A. S. Acampora et al., IEEE Transactions on Communications, Vol. Com. 26, No. 10, October 1978, pages 1463–1470; and in "The Viterbi Algorithm", G. D. Forney, Jr., Proceedings of the IEEE, Vol. 61, No. 3, March 1973, pages 268–278, the Viterbi decoding circuit 74 utilizes likelihood of correlation between data input successively thereto for detecting transit of the data and decodes the data on the basis of the detected result. Since the relationship $(1-D^2)$ of the reproduced signal relative to the signal used for recording (hereinafter referred to as the "recording signal") is utilized to decode the recording signal from the reproduced signal and then the digital video signal is decoded by the circuit 74 on the basis of the decoded data, the bit error rate of the decoded data can be reduced as compared with a standard decoding circuit which decodes data with reference to the signal level. Therefore, the decoded data output by the Viterbi decoding circuit 74 has high noise resistance. More specifically, by reason of the Viterbi decoding circuit 74 in the channel decoder 22, the reproduced C/N (carrier/noise) ratio is improved by 3 dB in respect to that achieved when decoding bit-by-bit.

Figure 8A:
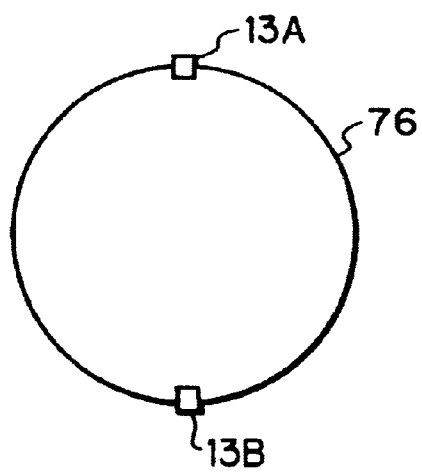
FIGS. 8A and 8B are schematic diagrams illustrating recording and reproducing head locations.
Figure 8B:
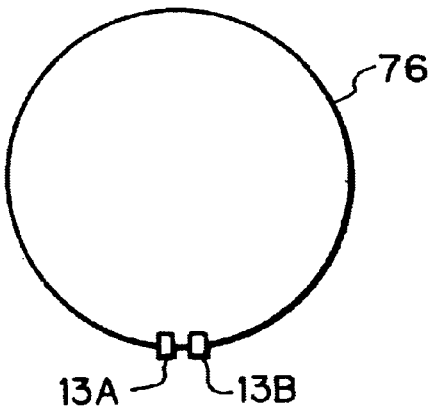

As shown in FIG. 8A, the magnetic heads 13A and 13B may be mounted in diametrically opposed positions on a rotation drum 76. However, as shown in FIG. 8B, the magnetic heads 13A and 13B are desirably mounted on the drum 76 adjacent each other in a unified construction. A magnetic tape (not shown on either FIG. 8A or 8B) is wrapped obliquely on the peripheral surface of the drum 76 with a winding angle of approximately 180°. With the head locations shown in FIG. 8A, the magnetic heads 13A and 13B are alternately contacted with the magnetic tape. On the other hand, with the heads located as shown in FIG. 8B, both of the magnetic heads 13A and 13B scan the magnetic tape at the same time.

Figure 9:
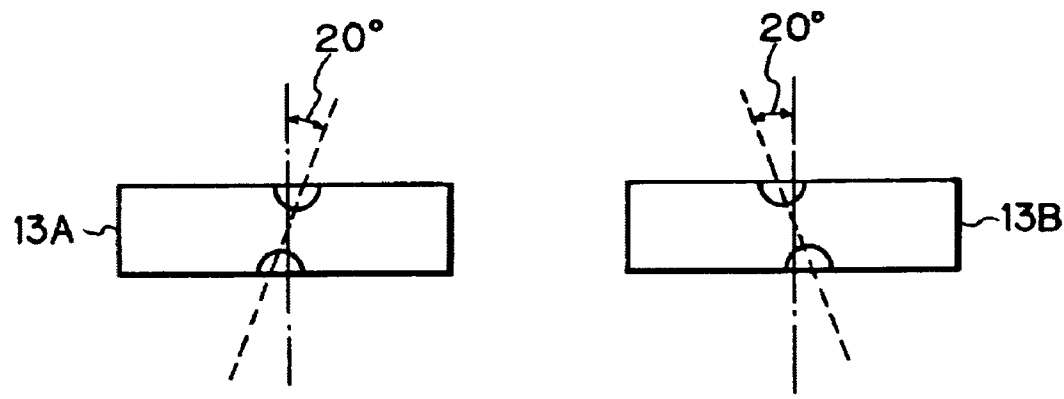
FIG. 9 is a schematic diagram illustrating the different azimuths of the recording and reproducing heads.
Figure 10:
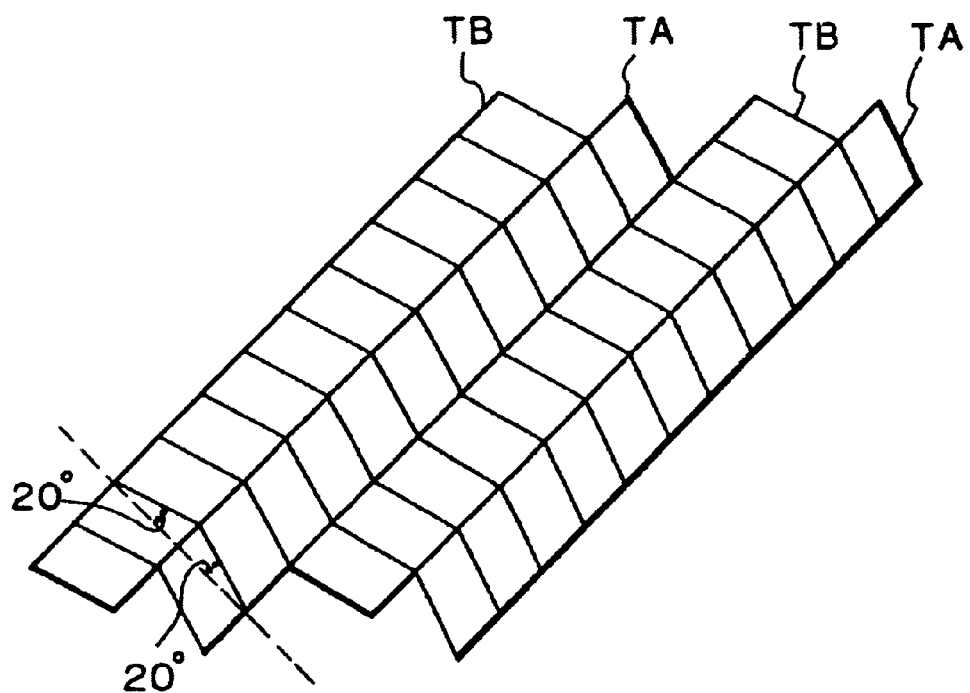
FIG. 10 is a schematic diagram of a record pattern formed by the heads with different azimuths.

The directions of the gaps of the magnetic heads 13A and 13B differ from each other, that is, the heads 13A and 13B have different azimuth angles. For example, as shown in FIG. 9, azimuth angles of ±20° are given to the magnetic heads 13A and 13B, respectively. By reason of the difference of the azimuth angles, a record pattern is formed on the magnetic tape, as shown in FIG. 10, in which adjacent tracks TA and TB on the magnetic tape are formed by the respective magnetic heads 13A and 13B, which have different azimuth angles. Thus, when the magnetic tape is played back or reproduced, due to an azimuth loss or attenuation, the amount of cross talk between adjacent tracks can be decreased.

Figure 11A:
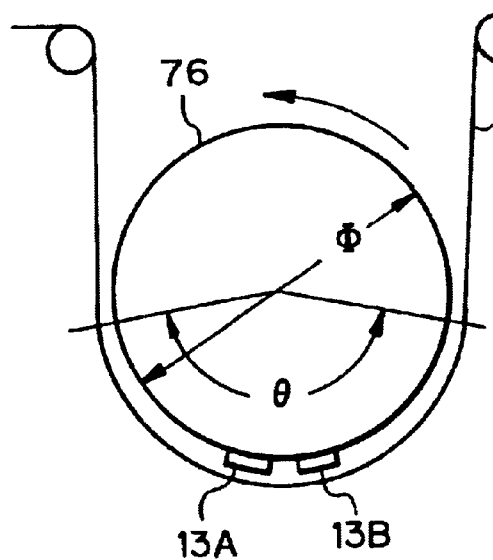
FIGS. 11A and 11B are a top view and a side view, respectively, showing the wrapping of a tape about a head drum assembly in a digital VTR according to this invention.
Figure 11B:
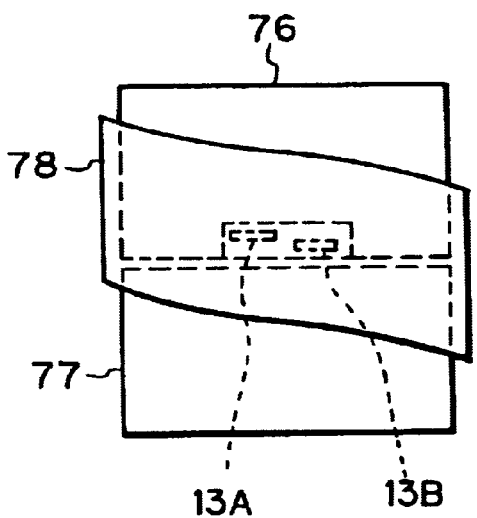

FIGS. 11A and 11B show a practical arrangement in which the magnetic heads 13A and 13B are adjacent each other, as in FIG. 8B and included in a unified structure to provide a so-called double azimuth head. By way of example, the unified magnetic heads 13A and 13B are shown to be mounted on an upper drum 76 which is rotated at a high speed of 150 rps for the NTSC system, while a lower drum 77 is fixed. Therefore, the unified heads 13A and 13B effect 2½ revolutions with the upper drum 76 for each NTSC field so that each field is recorded in five tracks. In other words, each field is divided into five segments recorded in respective tracks on the magnetic tape. By using this segment system, the length of the tracks can be decreased and, as a result, the track linearity error can be decreased. For example, the winding angle θ of the magnetic tape 78 on the drum assembly 76–77 is desirably set to be less than 180°, for example, approximately 166° and the drum diameter φ is desirably determined to be less than 25 mm, for example, 16.5 mm.

When recording on relatively narrow tracks, for example, tracks having a pitch of approximately 5.5 $\mu$m, mechanical errors in the head and drum system may affect the mechanical interchangeability. These mechanical errors may include static track linearity error, dynamic tracking linearity error and error in the positioning or pairing of the heads 13A and 13B.

The static track linearity error may be caused by nonlinearity of a lead on the drum, misalignment of the tape path and inclination of the rotational axis of the drum. The nonlinearity of the drum lead and the misalignment of the tape path are related to the track length, and the inclination of the rotational axis of the drum is related to the drum diameter. More specifically, the tracking factor, which is an indication of the static track linearity, is proportional to the track pitch and inversely proportion to the product of the track length and the drum diameter. In the above-described arrangement, the drum diameter is reduced from 40 mm to 16.5 mm and the track length is reduced from approximately 74 mm to approximately 26 mm, as compared with the drum diameter and track length, respectively, of a conventional 8 mm analog VTR. Therefore, a tracking factor larger than that of the 8 mm analog VTR can be obtained even through the track pitch is relatively small, for example, 5.5 $\mu$m. Thus, the static track linearity error for a digital VTR embodying this invention is less than that of the conventional 8 mm VTR.

Figure 12A:
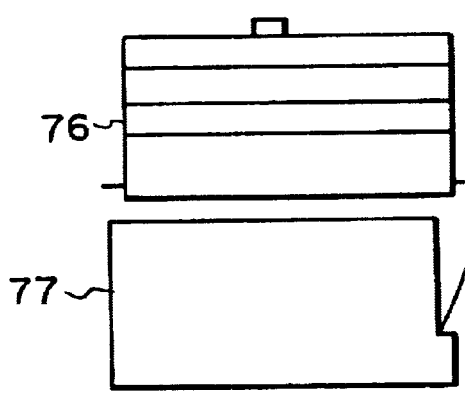
FIGS. 12A and 12B are schematic diagrams to which reference will be made in discussing the results of eccentricity of the drum on which the heads are mounted.
Figure 12B:
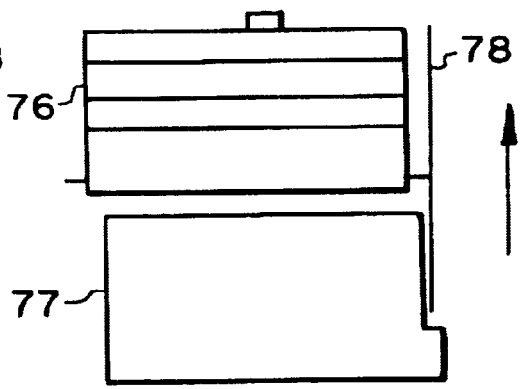

By using the double azimuth head, simultaneous recording is performed. Normally, due to eccentricity or the like of the rotating upper drum 76 relative to the fixed lower drum 77, the magnetic tape 78 vibrates and, thereby a track linearity error takes place. As shown in FIGS. 12A and 12B, if the heads are diametrically opposed, the eccentricity of the rotary upper drum 76 may urge the tape 78 downwardly when one of the heads, for example, the head 13A, traces a track on the tape (FIG. 12A), whereas, the tape 78 is urged upwardly when the other head 13B traces a track on the tape (FIG. 12B). By reason of the foregoing, adjacent tracks will be oppositely bowed and track linearity is substantially degraded. On the other hand, when the magnetic heads 13A and 13B are unified so as to substantially simultaneously scan respective tracks on the tape, any eccentricity of the rotary upper drum 76 similarly influences the linearity of the tracks scanned by both heads so that the linearity error is relatively reduced. Moreover, the distance between the heads 13A and 13B is relatively small when the heads are unified, as in the so-called double azimuth head, so that the paired heads can be more accurately adjusted then when the heads are diametrically opposed.

The above-described tape and head system enables tracks having a relatively narrow width or pitch, such as no more than 5.5 $\mu$m, to be recorded on the magnetic tape 78. Errors which may be produced by using this tape and head system are typically less than that produced by the conventional 8 mm VTR.

The tape used in the magnetic recording apparatus embodying this invention is desirably produced as described below so as to contribute to the attainment of the desired high recording density:

A solution containing an emulsion whose principal component is an acrylic acid latex is coated on a base film composed of a 7 $\mu$m thick polyethylene phthalate (PET). Thereafter, the base material is dried and thereby only fine projections made of the emulsion particles are formed. As a result, the surface roughness of the base material, measured as the center line average height, Ra, is about 0.0015 $\mu$m and the density of the fine projections is approximately 5,000,000 particles/mm$^2$.

Figure 13:
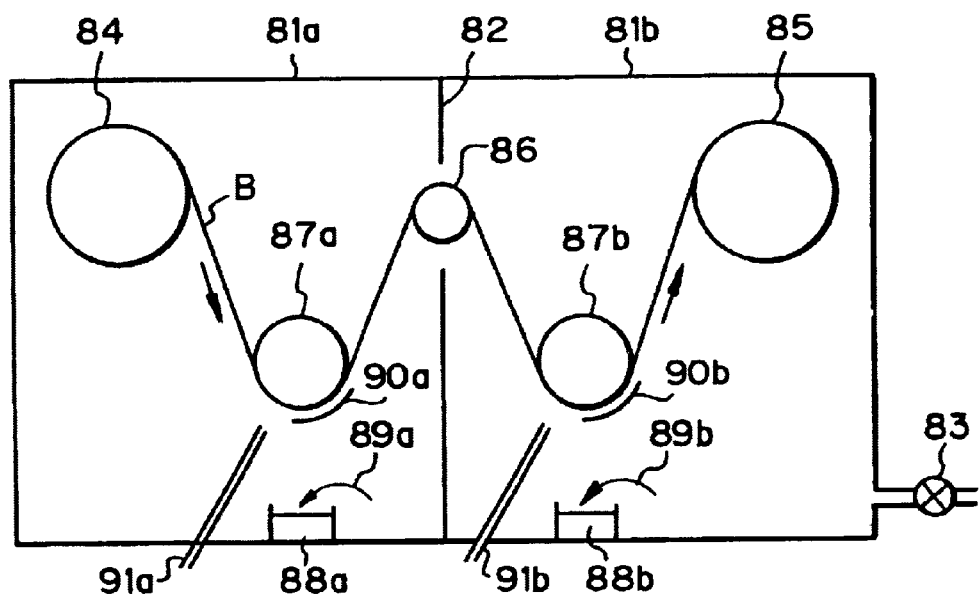
FIG. 13 is a schematic diagram of an apparatus used to produce a desirable magnetic tape for use with the digital VTR according to this invention.

Thereafter, by using a vacuum deposition unit shown in FIG. 13, a magnetic layer whose principal component is cobalt (Co) is formed on the base material in an oxygen atmosphere by the so-called slant-deposition method.

More particularly, the vacuum deposition unit of FIG. 13 is shown to include two communicating vacuum chambers 81$a$ and 81$b$ with a partition 82 therebetween, and with a vacuum exhaust valve 83 connected with the chamber 81$b$ and through which both chambers 81$a$ and 81$b$ can be evacuated. A supply roll 84 of the base material B for the magnetic tape is rotatably mounted within the chamber 81$a$, and a take-up roll 85 on which the completed magnetic tape material is wound is rotatably mounted within the chamber 81$b$. A guide roller 86 is situated in an opening in the partition 82 approximately at the same level as the rolls 84 and 85, and cylindrical cooling cans 87$a$ and 87$b$ are rotatably mounted within the chambers 81$a$ and 81$b$, respectively, at levels substantially below that of the guide roller 86 so that the base material B being unwound from the supply roll 84 is led downwardly therefrom under the cooling can 87$a$, then over the guide roller 86 and under the cooling can 87$b$ prior to being rewound on the take-up roll 85. Evaporation sources of cobalt 88$a$ and 88$b$ which, for example, may be ingots of 100% cobalt, are provided in the chambers 81$a$ and 81$b$, respectively, and are heated by electron beams indicated schematically at 89$a$ and 89$b$. Insulating shields 90$a$ and 90$b$ extend below the cooling cans 87$a$ and 87$b$, respectively, for restricting the incident angles at which cobalt evaporated from the sources 88$a$ and 88$b$ can impinge on the base material B running under the cooling cans 87$a$ and 87$b$. Finally, the chambers 81$a$ and 81$b$ are provided with oxygen gas supply pipes 91$a$ and 91$b$ for directing flows of oxygen against the surface of the base material B at areas thereof where evaporated cobalt is being deposited on the base material.

In the above-described vacuum deposition unit, as the web of base material B travels therethrough from the supply roll 84 past the cooling can 87$a$, the guide roller 86 and the cooling can 87$b$ to the take-up roll 85, two cobalt (Co) layers forming a magnetic coating are deposited at an angle to the base material, that is, by the slant deposition method, in an oxygen atmosphere.

The conditions under which such vacuum deposition is effected, are as follows:

The vacuum chambers 81a and 81b are maintained at a vacuum of $1 \times 10^{-4}$ Torr., while the pipes 91a and 91b introduce oxygen at a rate of 250 cc/min. into the vacuum chambers. The shields 90a and 90b are arranged so that the incident angles of the evaporated cobalt relative to the base material B are between 45° and 90°. The cobalt layer deposited on the base material at each of the cooling cans 87a and 87b is provided with a thickness of 1000 angstrom units, so that the total thickness of the magnetic layer formed on the base material is 2000 angstrom units.

After the magnetic layer composed of two cobalt layers has been formed on the web of base material B, the back or under side of the base material is coated with a uniform mixture of carbon and epoxy resin binder, and the cobalt magnetic layer is top coated with a perfluoro-polyether, as a lubricant. Finally, the coated web of base material B is cut into strips having widths of 8 mm so as to produce the desired magnetic tapes.

The magnetic tape produced as described above, has been found to have the following characteristics:

a residual magnetic flux density (Br) of 4,150 G;

a coercive force Hc of about 1690 Oe;

a rectangular ratio Rs of 79%;

and a surface roughness with a center line average height Ra as small as 0.0015 $\mu$m, which is due to the very low surface roughness of the base material B.

Although surface roughnesses are usually measured in accordance with JIS B 0601, the above noted surface roughness was measured under the following conditions:

measuring instrument: Talystep (from Rank/Taylor, Inc.)

stylus diameter: 0.2×0.2 $\mu$m (rectangular stylus)

stylus pressure: 2 mg high-pass filter: 0.33 Hz.

Figure 14:
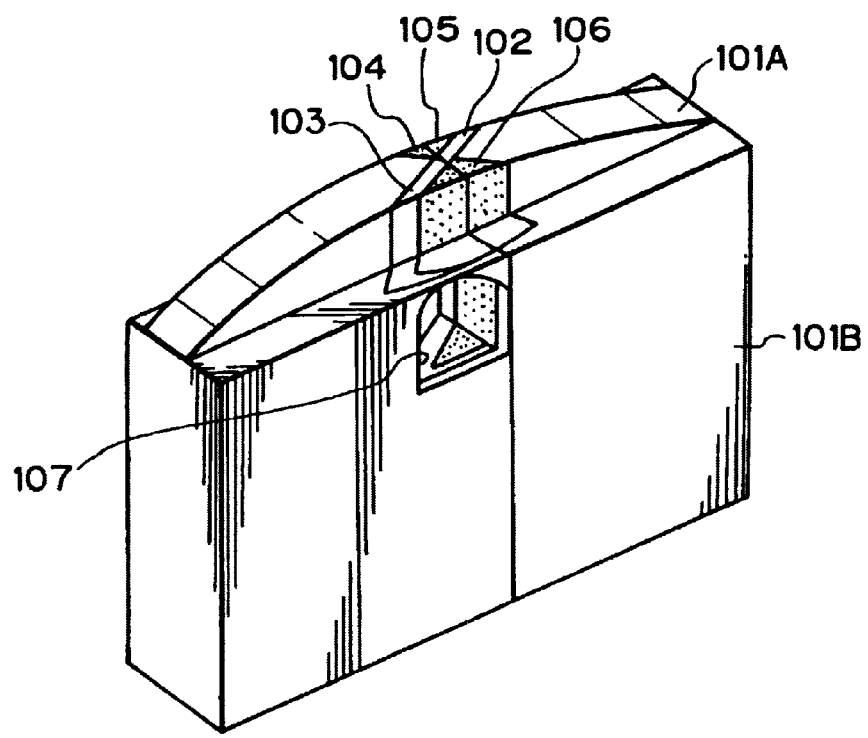
FIG. 14 is a perspective view showing an example of a preferred construction of a magnetic head for use in the digital VTR according to this invention.

Referring now to FIG. 14, it will be seen that a magnetic head desirably used in a magnetic recording apparatus embodying the present invention has monocrystal Mn—Zn ferrite cores 101A and 101B on which Fe—Ga—Si—Ru soft magnetic layers 102 and 103 are formed, by sputtering, for forming a gap 104 therebetween. Both sides of the gap 104, in the direction of the track width, are filled with glass, as at 105 and 106, to limit the effective gap length to 0.20 $\mu$m, and to limit the track width to approximately 4 $\mu$m. A winding hole 107 is provided for receiving a recording coil (not shown).

Since the magnetic head of FIG. 14 provides the Fe—Ga—Si—Ru soft magnetic layers 102 and 103 having a saturation magnetic flux density Bs of 14.5 kG in the vicinity of the gap 104, it is possible for the magnetic head to record data on a magnetic tape of high coercive force without causing magnetic saturation of the head.

By using the (ME) metal evaporated tape and the magnetic head as described above, a recorded bit area of 1.25 $\mu m^2$/bit or less can be achieved, so as to obtain an areal recording density of 0.8 bits/$\mu m^2$. In other words, the described ME tape and magnetic head make it possible to record a signal with the shortest wavelength of 0.5 $\mu$m on a track having a width of 5 $\mu$m so that the bit area of 1.25 $\mu m^2$/bit can be achieved while minimizing the deterioration of the C/N ratio of the reproduced output that otherwise results as the recording wavelength and track width are reduced.

In 1988, the assignee of this application produced an experimental consumer digital VTR which incorporated an ADRC bit reduction scheme, scrambled NRZ coding, a class IV partial response (PR4) detection scheme, and a modified 8 mm video transport mechanism used with ME tape. With a rotary drum having a diameter of 40 mm and a rotation speed of 60 rps, and using a track pitch of 15 $\mu$m at the wavelength of 0.5 $\mu$m, a raw bit error rate of $4 \times 10^{-5}$ and a C/N of 51 dB (with a resolution bandwidth of 30 KHz) at the half-Nyquist frequency were obtained. When such experimental consumer digital VTR was used with a track width of 5 $\mu$m, the C/N obtained was only approximately 44 dB and the picture quality was correspondingly degraded. However, the various features described above in respect to the apparatus for magnetically recording digital data in accordance with this invention, and in respect to the ME tape for use therewith, serve to compensate for the reduction of the C/N by 7 dB, that is, make it possible to obtain a C/N of 51 dB with a track pitch of 5 $\mu$m.

In connection!with the foregoing, it is known that an increase in the space between the tape and the magnetic head recording or reproducing a signal on the tape causes the signal output level to decrease. Further, it is known that the space between the tape and the magnetic head depends on the flatness of the tape. In the case of a tape of the coated-type, the flatness of the tape depends on the coating material that is used, whereas, in the case of a vacuum deposited tape, such as, an ME tape, the flatness of the tape surface depends on the smoothness of the base material on which the metal is vacuum deposited. It has been determined that, when the surface of the base film is made as flat as possible, for example, as described above the C/N is increased by 1 dB. Furthermore, by effecting the vacuum deposition of cobalt on such base material or film in the manner described above, with reference to FIG. 13, the C/N ratio is further improved by 3 dB, as compared with the tape used in the experimental consumer digital VTR produced in 1988. Further, by using a Viterbi channel decoding scheme, as described above, there is realized a further increase of 3 dB in the C/N ratio over the bit-by-bit decoding scheme employed in the experimental apparatus.

As a result, the deterioration of 7 dB in the C/N ratio associated with a reduction of the track pitch to 5 $\mu$m is fully compensated so that, with a recording density resulting in a bit area of 1.25 $\mu m^2$/bit, the described embodiment of this invention makes it possible to achieve a raw bit error rate of $4 \times 10^{-5}$, that is, a raw bit error rate equivalent to that achieved by the experimental apparatus of 1988 with a track pitch of 15 $\mu$m. In connection with the foregoing, it is to be noted that the raw bit error rate, that is, the bit error rate prior to correction, needs to be $10^{-4}$ or less in order to ensure that the errors will be contained within a correctable amount when error correction codes with a redundancy of about 20% are employed.

Therefore, a digital picture signal can be recorded on a magnetic tape with a relatively high density by using tracks having a relatively small pitch in accordance with the described embodiment of the present invention. As a result, such embodiment of the present invention enables a relatively long recording or reproducing operation to be performed on a magnetic tape that can be contained in a relatively small size cassette. Furthermore, since a relatively small diameter rotational drum is utilized, the size of the cassette housing and of the tape loading mechanism can be further reduced for minimizing the size of the VTR.

An example of a tape cassette 211 for use with the above-described recording and reproducing apparatus will now be described with reference to FIGS. 15A, B, C and D.

Figure 15A:
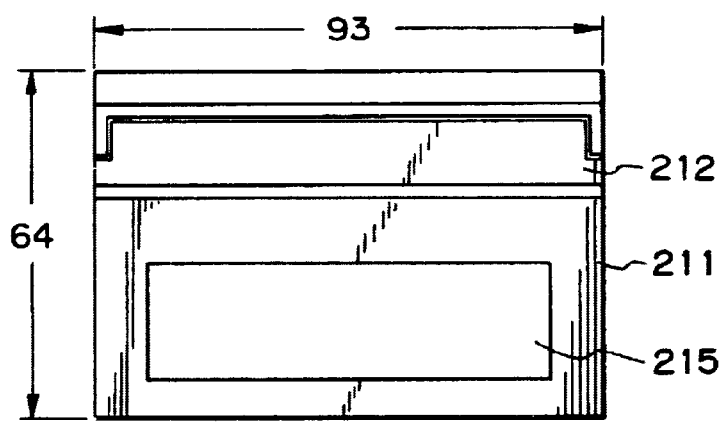
FIGS. 15A, B, C and D illustrate top, side, bottom and perspective views, respectfully, of a tape cassette.
Figure 15B:
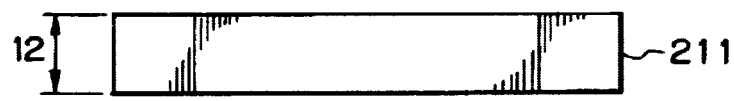
Figure 15C:
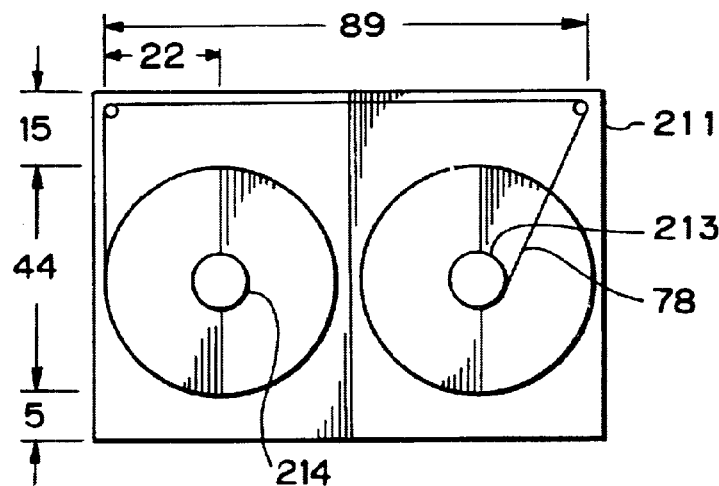

As shown in FIG. 15A, a transparent window 215 is provided on the top wall of the tape cassette 211 to enable a visual inspection of the inside of the tape cassette. The dimensions of the tape cassette 211 are slightly smaller than those of the cassette intended for use in the conventional 8 mm analog VTR. As shown in FIGS. 15A and B, the dimensions of the tape cassette 211 may be 93 mm (width)× 64 mm (depth)×12 mm (thickness). FIG. 15C illustrates the tape cassette 211 with its top wall removed to show hubs 213 and 214 which are rotatably disposed within the tape cassette housing. The magnetic tape 78 is wound around hubs 213 and 214, and is suitably guided therebetween.

As shown in FIGS. 15A and D, a pivoted cover or lid 212 is mounted at the front of the tape cassette 211. When the tape cassette 211 is loaded into a VTR (not shown), the lid 212 is pivotally opened by a conventional member provided therefor within the VTR, so as to allow access to the magnetic tape 78 contained in the cassette housing.

The tape cassette 211 having the indicated dimensions is, nevertheless, adapted to contain an amount of the magnetic tape 78 sufficient to enable 4 hours of recording operations. The number of bits to be recorded in 4 hours is:

$$31.56 \times 10^6 \times 60 \times 60 \times 4 = 4.545 \times 10^{11} \text{ bits}$$

The required tape area needed to record $4.545 \times 10^{11}$ 0 bits of data is:

$$4.545 \times 10^{11} \times 1.25 \ (\mu m^2/bit) = 5.681 \times 10^5 \text{ mm}^2$$

If, for example, the tape has a width of 6 mm and an effective width of 5 mm, the length of tape needed to obtain a tape recording area of $5.681/\times 10^5$ mm$^2$ is:

$$5.681 \times 10^5 \text{ mm}^2/5 \text{ mm} = 113{,}625 \text{ mm} = 113.6 \text{ m}$$

The volume occupied by a tape having a length of 113.6 m, width of 6 mm and a thickness of 7 $\mu$m is:

$$113.6 \times 10^3 \times 6 \times 0.007 = 4771.2 \text{ mm}^3$$

The radius x of a reel containing a tape having a length of 113.6 and a width of 6 mm (assume that the diameters of the reel hubs 213 and 214 are each 16 mm) can be derived, as follows:

$$x^2 \pi \times 6 = 8^2 \pi \times 6 + 4771.2$$

x=17.8 mm.

Since the maximum allowable winding radius of the tape 78 in the tape cassette 211 is 22 mm, as shown in FIG. 15C, the above-described amount of tape can be well contained on reel hubs 213 and 214 in the tape cassette 111. Thus, a recording operation of 4 hours can be performed.

Although the above calculations have assumed a tape width of 6 mm and an effective width, that is, the width of the tape across which signals can be recorded, of 5 mm, it is to be understood that, in accordance with this invention, the tape width may be as large as 8 mm (effective width 7 mm) or as small as 5 mm (effective width 4 mm) with the limits of the recording time being correspondingly adjusted.

A tape loading mechanism for use with the above-described recording and reproducing apparatus will now be described with reference to FIG. 16 which shows a drum chassis 111 and a cassette support chassis 114. The drum chassis 114 has a drum 76, a tension regulator 112 and a capstan 113 mounted thereon. On the other hand, the cassette support chassis 114 operatively positions a cassette 115 which contains, reels 116 and 117 and roller guides 118, 119, 122 and 123 for the tape 78 running between the reels.

Figure 15D:
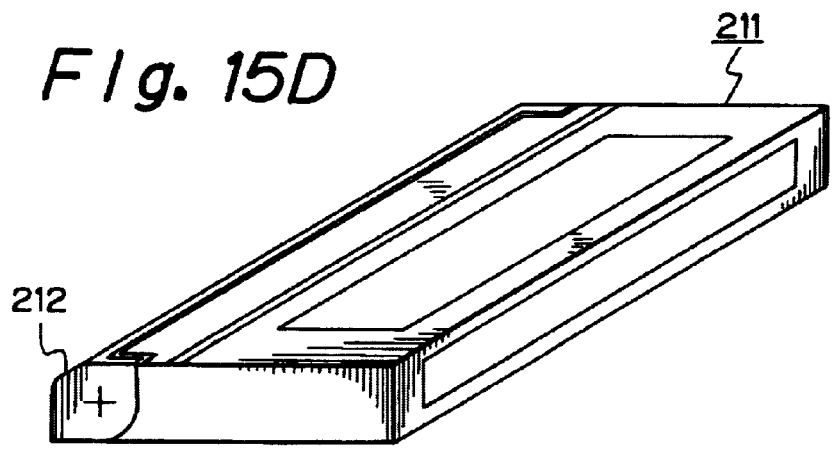
Figure 16:
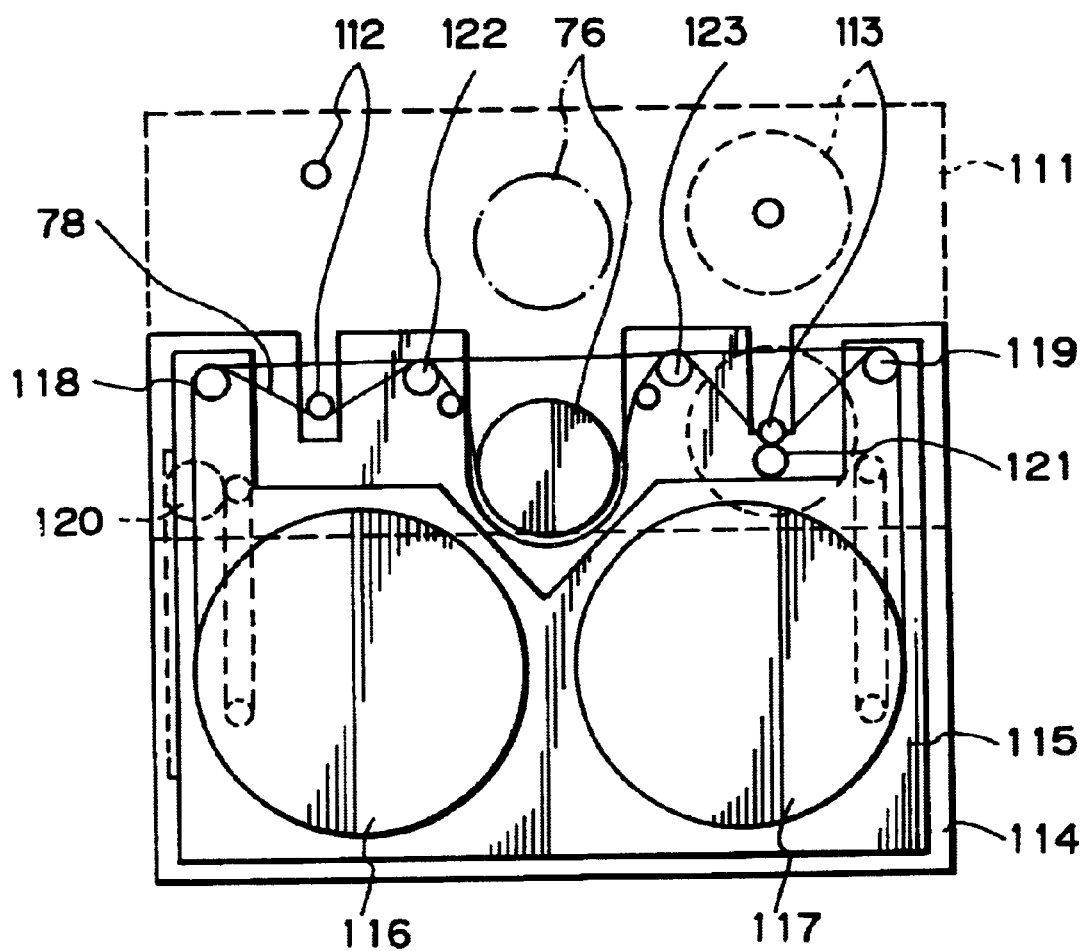
FIG. 16 is a diagram of a tape loading mechanism.

In an unloaded state, that is, when the tape 78 in the cassette 115 on chassis 114 is not loaded so as to engage the drum 76 on chassis 111 of a VTR, the drum chassis 111 is in the position shown by the broken lines of FIG. 16. However, when the tape 78 is to be loaded, a loading motor (not shown) is energized to drive a gear 120 so as to move the drum chassis 111 toward the cassette support 114. At the initiation of such movement of the drum chassis 111, a lid of the cassette 115 (similar to the lid 212 on FIG. 15D) is opened so as to allow the drum 76, tension regulator 112 and capstan 113 on chassis 111 to be inserted into the cassette 115. More specifically, the drum 76 is inserted into the cassette 115 so that the magnetic tape 78 between the guides 122 and 123 is wound on a portion of the periphery of the drum. This portion, or winding angle is less than 180°. In a preferred embodiment, the winding angle is approximately 166°. Further, the tension regulator 112 is inserted into a cut-out portion at the front of the cassette 115 so as to contact the magnetic tape 78 between the guides 118 and 122 and impose a predetermined tension thereon. Furthermore, the capstan 113 is inserted so as to engage the tape between guides 119 and 123 with a pinch roller 121 of the cassette 115, thereby causing the magnetic tape 78 to travel about the drum 76 at a predetermined rate.

Since the winding angle is relatively small, the frictional drag of the moving magnetic tape on the drum 76 is less than that of arrangements utilizing a larger winding angle. This reduction in frictional drag is particularly advantageous when the VTR is operated in a fast forward state or a rewind state. Further, if the winding angle is 180° or more, cross talk between signals may occur when two channels of data are recorded or reproduced using a double azimuth head. However, using a winding angle of less than 180°, as in the preferred embodiment of the present invention, eliminates cross talk between signals. Furthermore, since only one of the drum chassis 111 and the cassette support chassis 114 is movable relative to the other, the complexity of the loading mechanism can be minimized.

As previously stated, one way to increase the recording density is to decrease the track pitch. However, decreasing the track pitch typically results in increased cross talk between signals recorded in adjacent tracks. In the prior art, blank spaces or guard bands are sometimes used between adjacent tracks so as to isolate the signals recorded in those tracks, thereby reducing cross talk. However, since signals are not recorded in the guard bands, using them reduces the tape recording density. Therefore, as is to be appreciated, it is desirable to eliminate guard bands and yet still provide isolation between signals recorded in adjacent tracks. One means to accomplish this for high frequency signals is to position the heads which record in adjacent tracks so that the gaps of such heads have different azimuth angles. More specifically, by providing the heads with different azimuth angles, each head will strongly reproduce the high frequency signals in the tracks corresponding to the respective head, while the high frequency signals in the adjacent tracks will not be substantially reproduced due to azimuth error or attenuator. Heretofore, the azimuth angles have been about 10° or less.

However, in order to allow the track pitch to be decreased to be about 5 $\mu$m so as to increase the recording density and still avoid cross talk between signals recorded in adjacent tracks, the magnetic heads 13A and 13B are provided with azimuth angles of ±20°, respectively.

Figure 17:
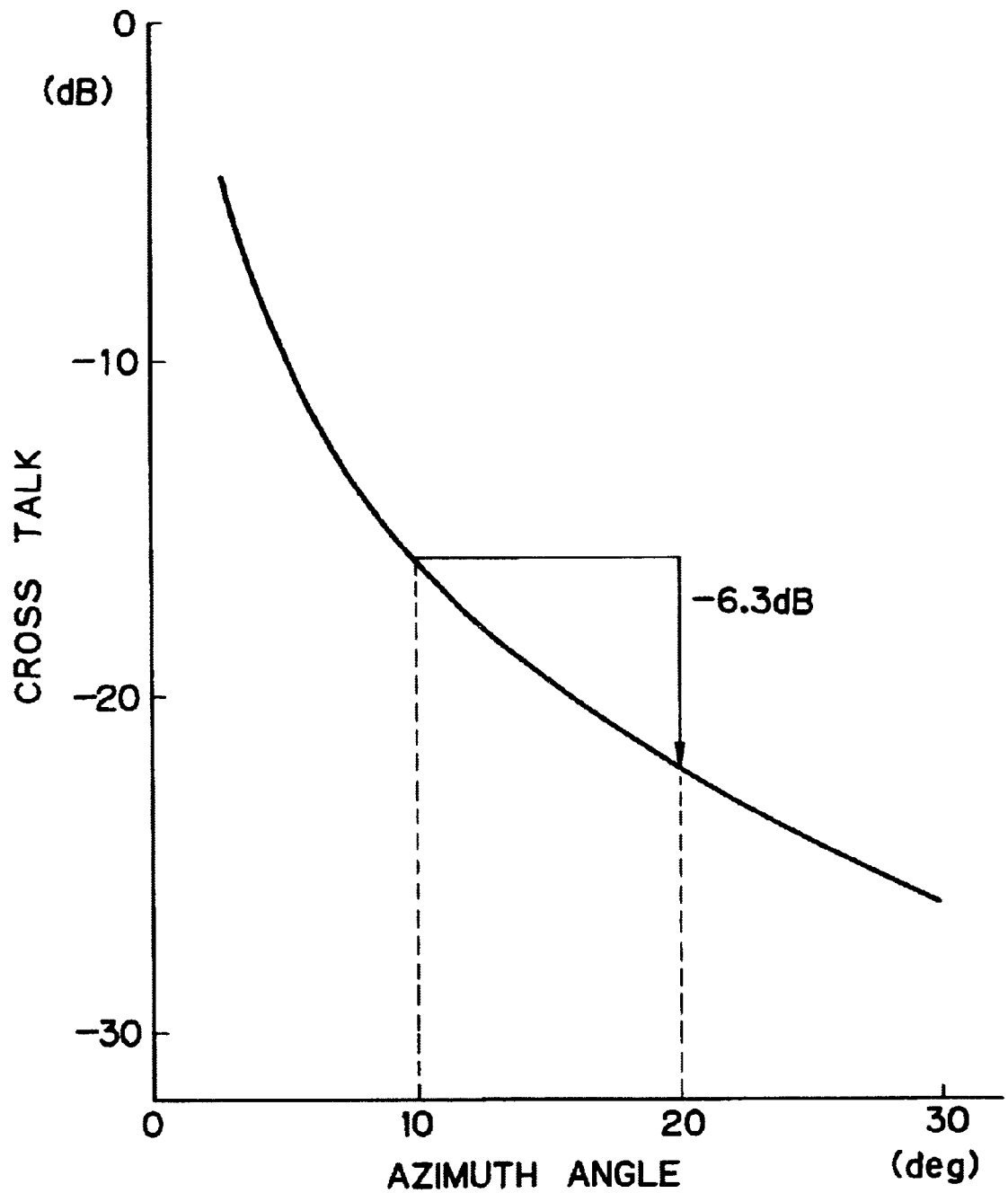
FIG. 17 is a graph of the relationship between cross talk and azimuth angle.
Figure 18:
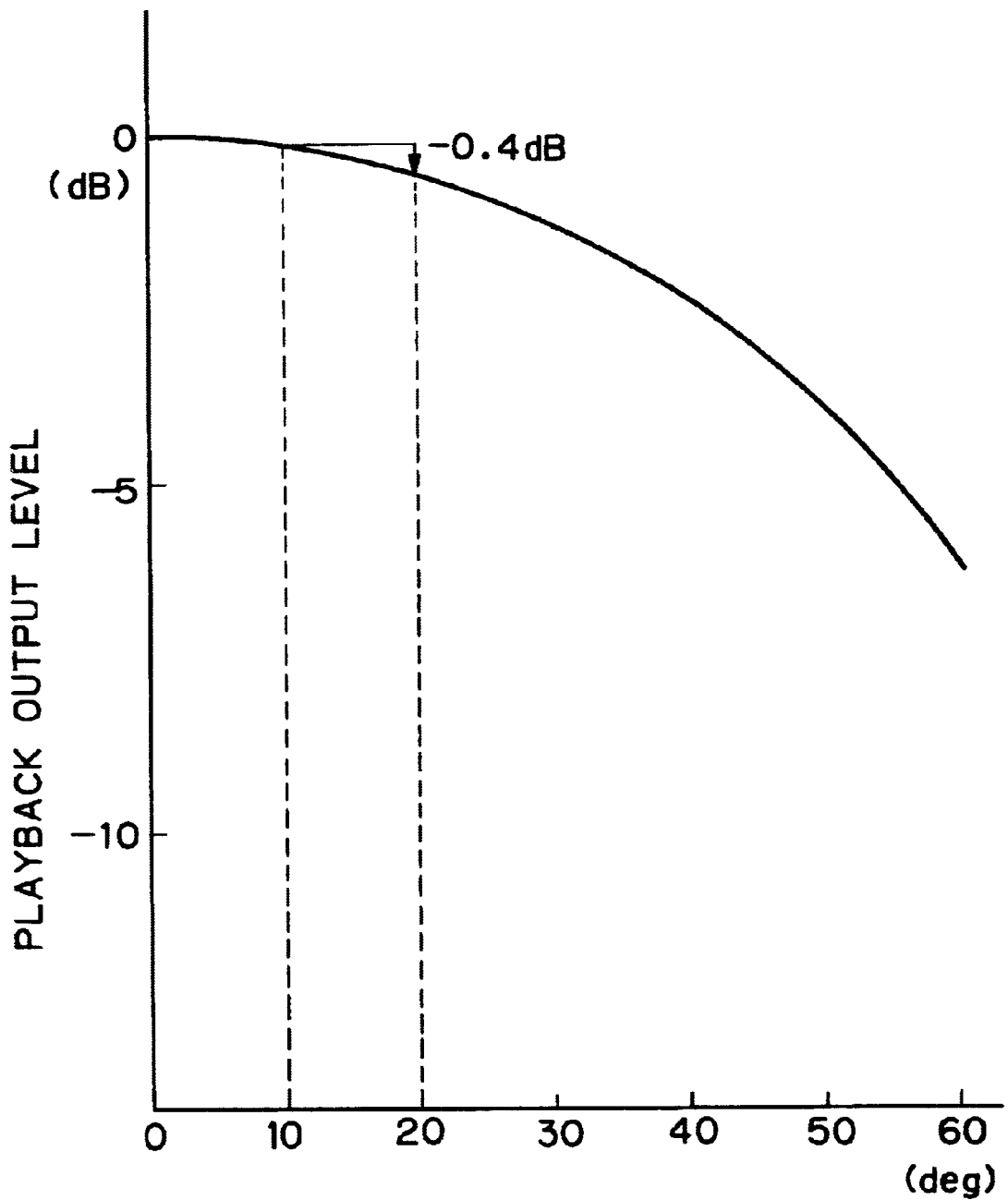
FIG. 18 is a graph of the relationship between the level of a reproduced signal and the azimuth angle.

The selection of the ±20° azimuth angles will now be explained with reference to FIG. 17 which illustrates the relationship between cross talk and azimuth angle. The values of FIG. 17 were obtained from a reproduced signal passed through a partial response class IV (PR 4) filter at the Nyquist frequency for a case where the track pitch is approximately 5.5 μm and the speed of the magnetic tape 78 is approximately 7.75 m/sec. As shown in FIG. 17, the amount of cross talk decreases as the azimuth angle increases. However, as the azimuth angle increases the effective relative speed in a direction normal to the gaps of the magnetic heads 13A and 13B decreases. As a result, the level of the playback signal decreases as shown, for example, in FIG. 18.

The following table shows the amount of decrease of the cross talk and the amount of decrease of the playback signal level when the azimuth angle is changed from 10° to various other angles:

| Azimuth angle | Amount of decrease of cross talk (dB) | Amount of decrease of playback signal (dB) |
|---|---|---|
| 10° to 15° | −3.64 | −0.17 |
| 10° to 20° | −6.30 | −0.41 |
| 10° to 25° | −8.45 | −0.72 |
| 10° to 30° | −10.31 | −1.12 |

It has been found that, when the azimuth angle is approximately 20°, both the amount of decrease of cross talk and the amount of decrease of the playback signal are suitable for a digital VTR.

Thus, in a preferred embodiment of the present invention, the azimuth angles of the magnetic heads 13A and 13B are set to approximately ±20°. There azimuth angles significantly reduce the amount of cross talk between adjacent tracks while ensuring that the level of the playback signal will be at an acceptable level for digital signals. Therefore, by using the azimuth angles of ±20°, tracks can be formed on the magnetic tape 78 having a relatively narrow track pitch without guard bands so as to increase the recording density.

Having described illustrative embodiments of the invention with reference to the accompanying drawings, it is to be understood that the invention is not limited thereto, and that various changes and modifications can be effected therein by one skilled in the art without departing from the scope or spirit of the invention as defined in the appended claims.

What is claimed is:

1. An apparatus receiving an input digital picture signal and reducing the data of the received input digital picture signal by a ratio of approximately 1:9 so as to provide a recordable signal having a reduced data bit rate for recording the reduced data bit rate signal, said apparatus comprising:

a magnetic tape wound in a cassette and having a width of no more than approximately 8 mm and a thickness of no more than approximately 7 μm, said magnetic tape having a number of predetermined characteristics including a residual magnetic flux density value of approximately 4150 G so as to enable said reduced data bit rate signal to be recorded thereon with a relatively high areal recording density; and means for recording said reduced data bit rate signal in successive skewed tracks on said tape with said relatively high areal recording density, in which said reduced data bit rate signal is recorded with a minimum wavelength of 0.5 μm.

2. An apparatus receiving an input digital picture signal and reducing the data of the received input digital picture signal by a ratio of approximately 1:9 so as to provide a recordable signal having a reduced data bit rate for recording the reduced data bit rate signal, said apparatus comprising:

a magnetic tape wound in a cassette and having a width of no more than approximately 8 mm and a thickness of no more than approximately 7 μm, said magnetic tape having a number of predetermined characteristics including a residual magnetic flux density value of approximately 4150 G so as to enable said reduced data bit rate signal to be recorded thereon with a relatively high areal recording density; and means for recording said reduced data bit rate signal in successive skewed tracks on said tape with said relatively high areal recording density, in which said reduced data bit rate signal is recorded with a minimum wavelength of 0.4 μm.

3. An apparatus receiving an input digital picture signal and reducing the data of the received input digital picture signal by a ratio of approximately 1:9 so as to provide a recordable signal having a reduced data bit rate for recording the reduced data bit rate signal, said apparatus comprising:

a magnetic tape wound in a cassette and having a width of no more than approximately 8 mm and a thickness of no more than approximately 7 μm, said magnetic tape having a number of predetermined characteristics including a residual magnetic flux density value of approximately 4150 G so as to enable said reduced data bit rate signal to be recorded thereon with a relatively high areal recording density; and means for recording said reduced data bit rate signal in successive skewed tracks on said tape with said relatively high areal recording density, in which said magnetic tape has an average surface roughness of approximately 0.0015 μm.

4. An apparatus receiving an input digital picture signal and reducing the data of the received input digital picture signal by a ratio of approximately 1:9 so as to provide a recordable signal having a reduced data bit rate for recording the reduced data bit rate signal, said apparatus comprising:

a magnetic tape wound in a cassette and having a width of no more than approximately 8 mm and a thickness of no more than approximately 7 μm, said magnetic tape having a residual magnetic flux density value of approximately 4150 G; and means for recording said reduced data bit rate signal in successive skewed tracks each having a relatively small minimum width on said tape, said means for recording including at least two recording heads for recording in adjacent tracks in which said two recording heads have gaps with different azimuth angles of substantially ±20°.

5. An apparatus as in claim 4, in which said minimum width has a value of approximately 5.0 μm.

6. An apparatus as in claim 4, in which said minimum width has a value of approximately 4.0 μm.

* * * * *